US011280362B2

(12) United States Patent
McDuff

(10) Patent No.: US 11,280,362 B2
(45) Date of Patent: Mar. 22, 2022

(54) ANCHOR ASSEMBLY FOR FASTENER

(71) Applicant: COBRA FIXATIONS CIE LTEE—COBRA ANCHORS CO. LTD., Montreal (CA)

(72) Inventor: Pierre McDuff, Outremont (CA)

(73) Assignee: COBRA FIXATIONS CIE LTEE—COBRA ANCHORS CO. LTD., Montreal (CA)

( * ) Notice: Subject to any disclaimer, the term of this patent is extended or adjusted under 35 U.S.C. 154(b) by 170 days.

(21) Appl. No.: 16/468,230

(22) PCT Filed: Dec. 8, 2016

(86) PCT No.: PCT/CA2016/000302
§ 371 (c)(1),
(2) Date: Jun. 10, 2019

(87) PCT Pub. No.: WO2018/102902
PCT Pub. Date: Jun. 14, 2018

(65) Prior Publication Data
US 2019/0331147 A1    Oct. 31, 2019

(51) Int. Cl.
*F16B 13/06* (2006.01)
*F16B 13/00* (2006.01)
*F16B 13/08* (2006.01)

(52) U.S. Cl.
CPC ........ *F16B 13/002* (2013.01); *F16B 13/0808* (2013.01)

(58) Field of Classification Search
CPC .................................................. F16B 13/0808

USPC ......................................... 411/340, 341, 342
See application file for complete search history.

(56) References Cited

U.S. PATENT DOCUMENTS

| 3,513,746 A | * | 5/1970 | Forsberg ............. F16B 13/0808 411/346 |
| 4,043,245 A | | 8/1977 | Kaplan |
| 4,075,924 A | | 2/1978 | McSherry et al. |
| 4,120,231 A | * | 10/1978 | Neumayer .......... F16B 13/0808 411/340 |
| 4,286,497 A | * | 9/1981 | Shamah .................. F16B 37/04 411/342 |

(Continued)

FOREIGN PATENT DOCUMENTS

| WO | 2004102014 | 11/2004 |
| WO | 200699728 | 9/2006 |

*Primary Examiner* — Gary W Estremsky
(74) *Attorney, Agent, or Firm* — Benoît & Côté Inc.; Michel Sofia

(57) ABSTRACT

An anchor assembly for walls comprises a toggle member and a strap member pivotally mounted together, and a locking member. In a first position, the toggle member is aligned with the strap member for insertion through the wall, whereas in a second position, the toggle member extends behind the wall at an angle relative to the strap member which extends from the toggle member through the hole in the wall. The locking member is adapted to be displaced along the strap member until it engages the wall and to be locked on the strap member. Therefore, the locking member and the toggle member are connected by the strap member and imprison the wall by abutting respectively the visible and hidden sides thereof. A fastener introduced through the locking member and the wall threadably engages an opening defined in the toggle member.

18 Claims, 39 Drawing Sheets

(56) References Cited

U.S. PATENT DOCUMENTS

| | | | |
|---|---|---|---|
| 4,294,156 A | | 10/1981 | McSherry et al. |
| 4,573,844 A | * | 3/1986 | Smith ................ F16B 13/0808 |
| | | | 24/453 |
| 4,650,386 A | | 3/1987 | McSherry et al. |
| 4,657,461 A | * | 4/1987 | Smith ................ F16B 13/0808 |
| | | | 24/453 |
| 4,865,501 A | * | 9/1989 | Ferris ................ F16B 13/0808 |
| | | | 411/340 |
| 6,347,435 B1 | * | 2/2002 | Davignon .......... B65D 63/1063 |
| | | | 24/16 PB |
| 6,821,069 B2 | * | 11/2004 | Ikuta .................. F16B 13/0808 |
| | | | 411/340 |
| 7,001,126 B2 | * | 2/2006 | Lesecq ............... F16B 19/1054 |
| | | | 411/340 |
| 8,303,222 B2 | * | 11/2012 | Yoshida ................. F16B 43/00 |
| | | | 411/82.5 |
| 9,394,932 B2 | * | 7/2016 | McDuff .............. F16B 13/0808 |
| 2003/0118420 A1 | | 6/2003 | Ikuta |
| 2004/0170486 A1 | * | 9/2004 | DeMeo .............. F16B 13/0808 |
| | | | 411/340 |
| 2006/0088399 A1 | * | 4/2006 | DeMeo .............. F16B 13/0808 |
| | | | 411/340 |

\* cited by examiner

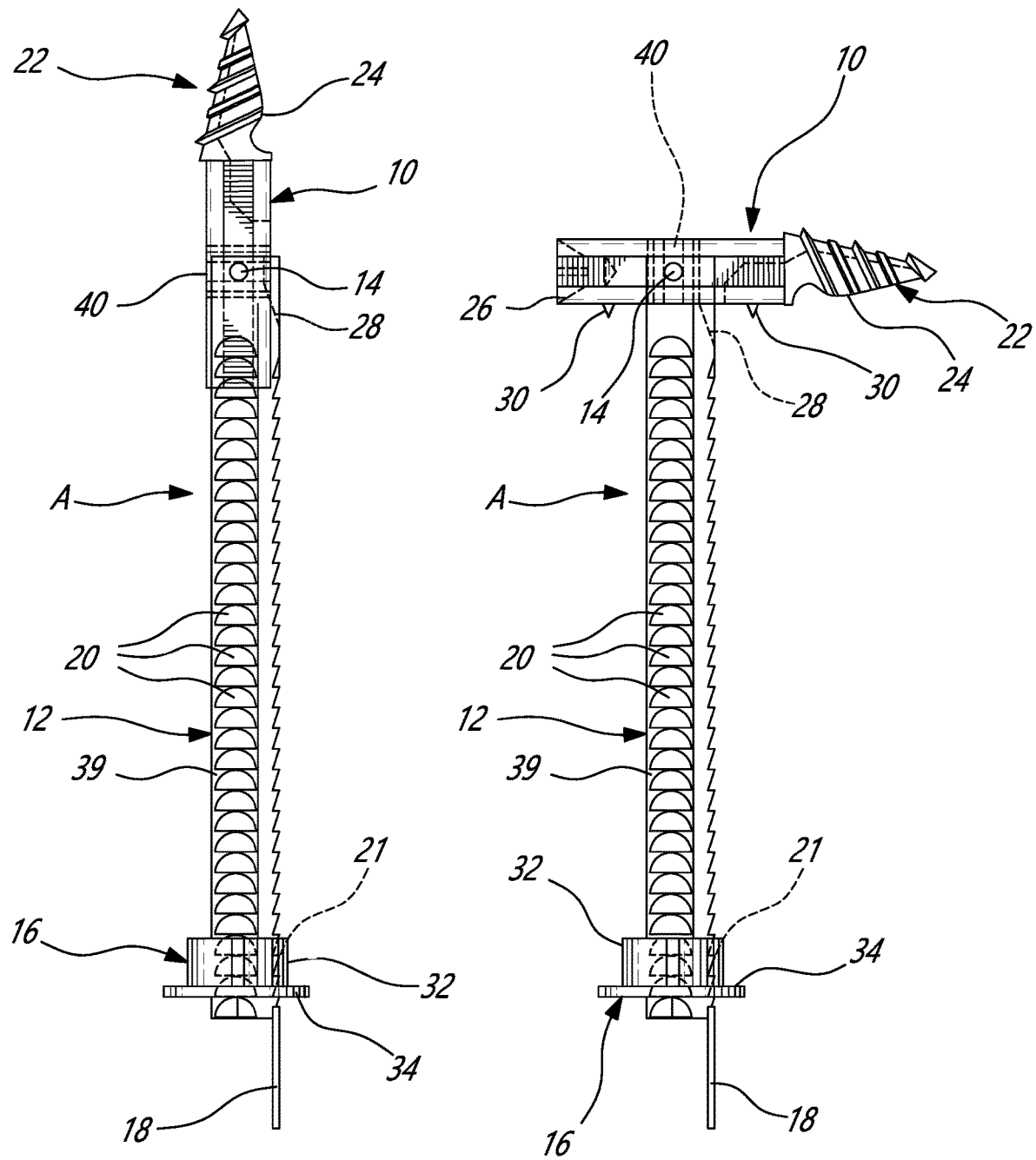

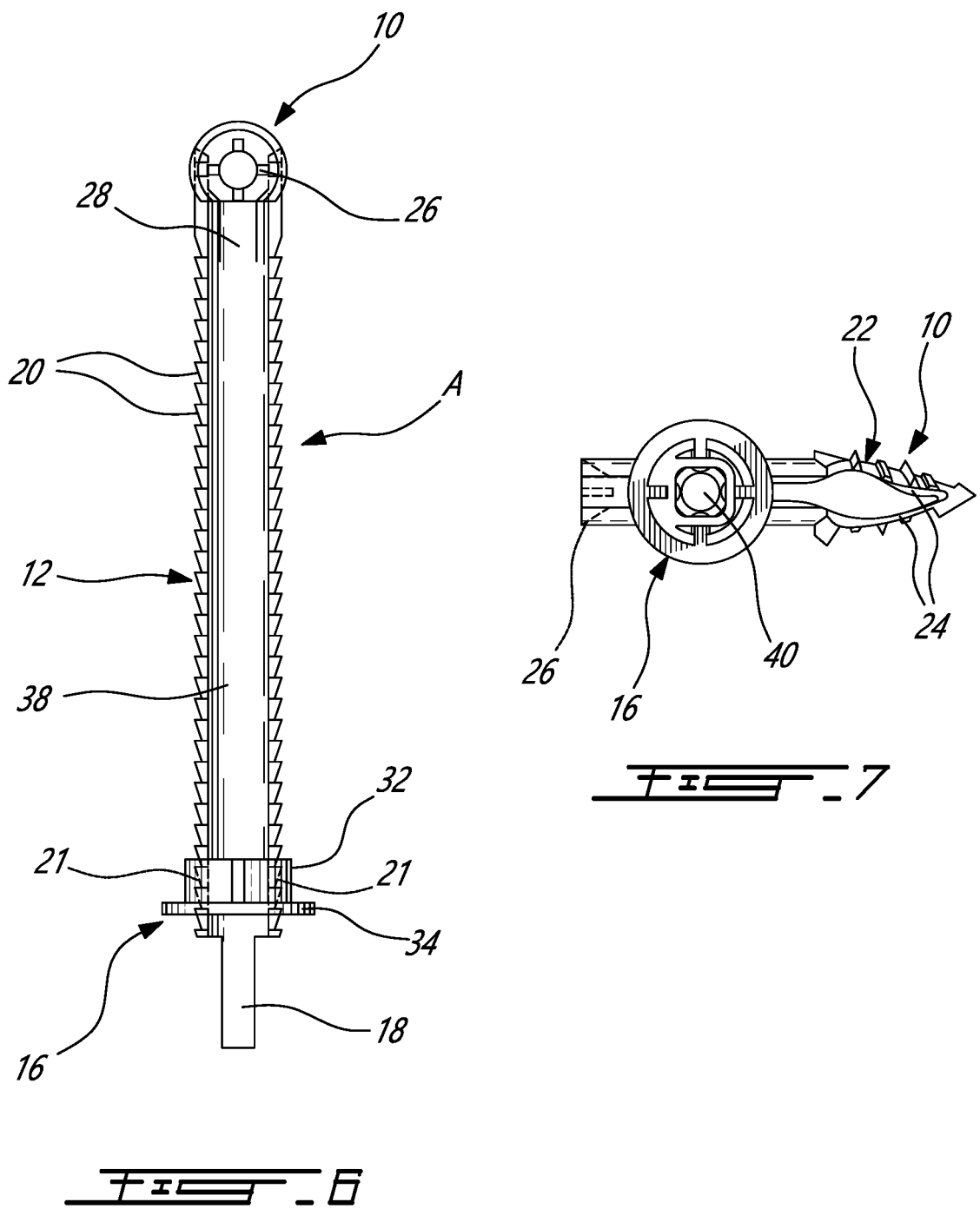

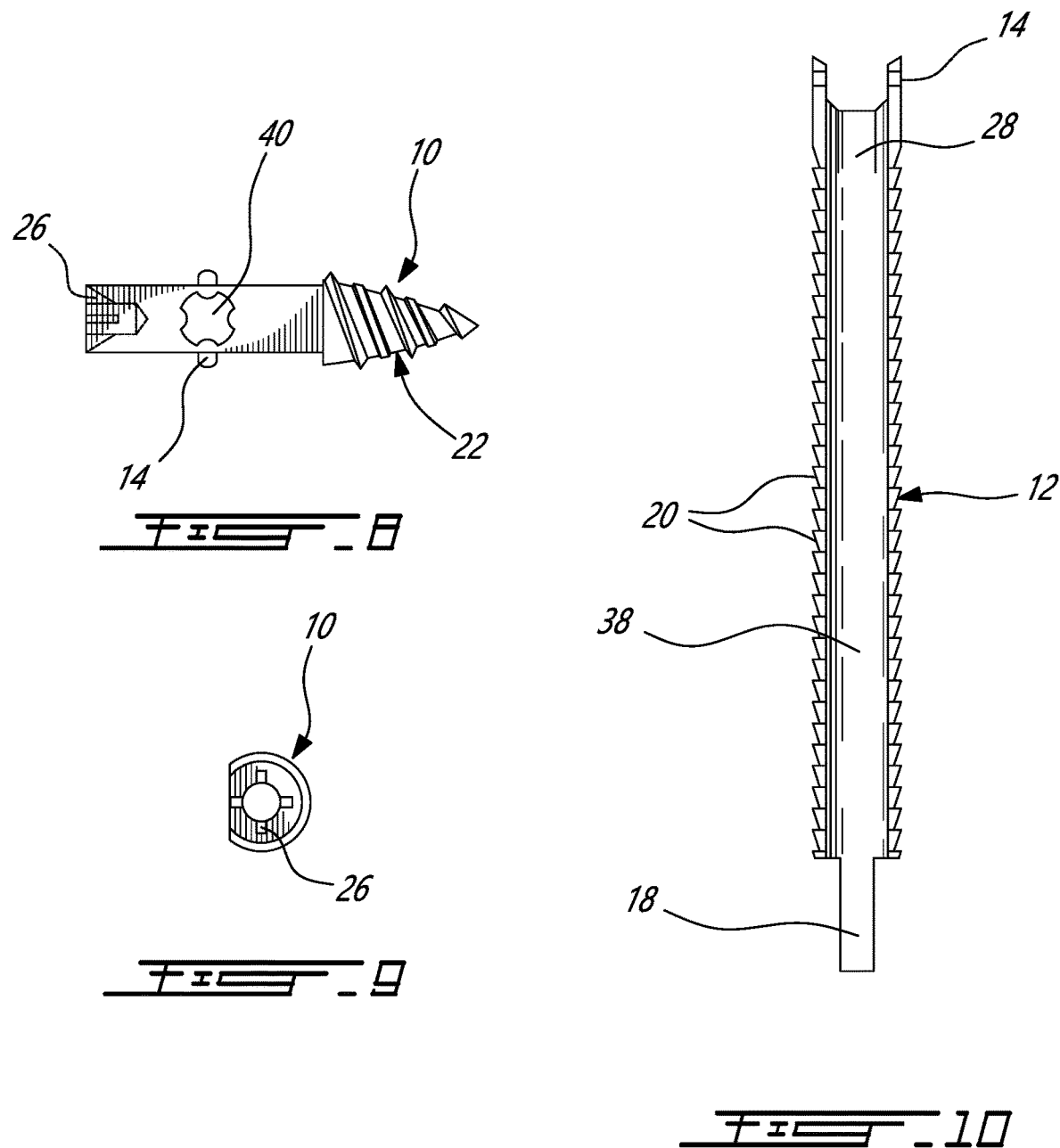

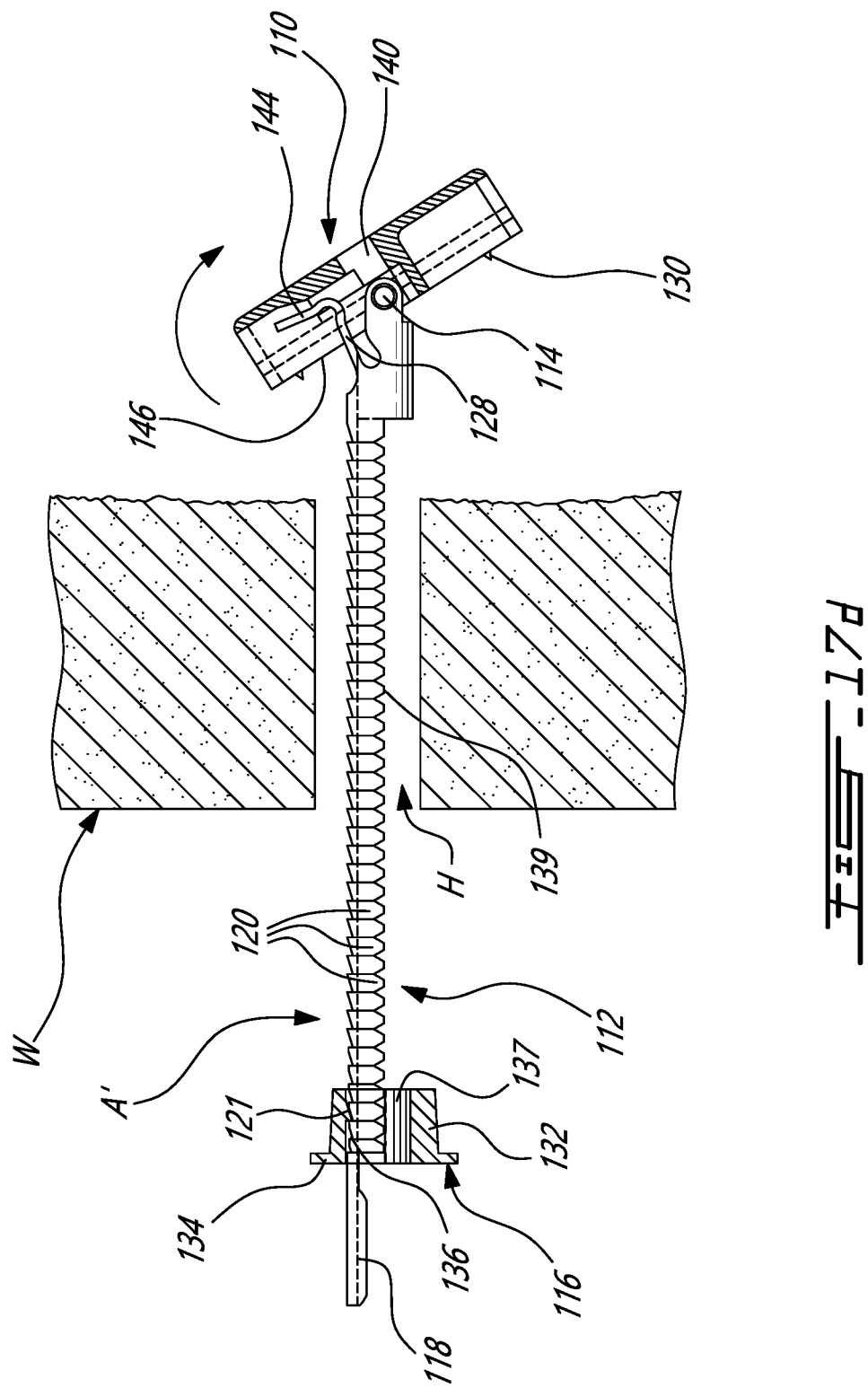

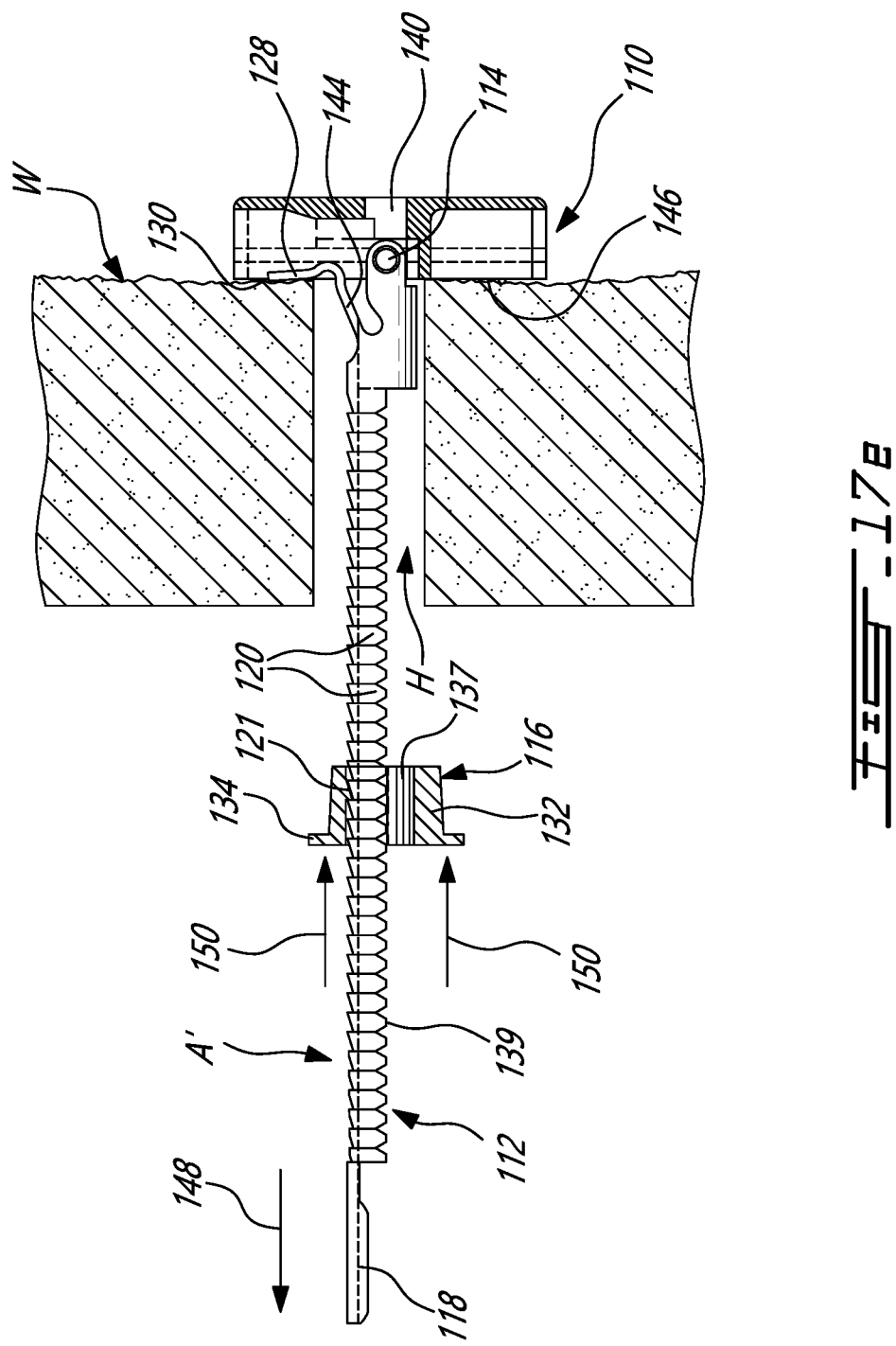

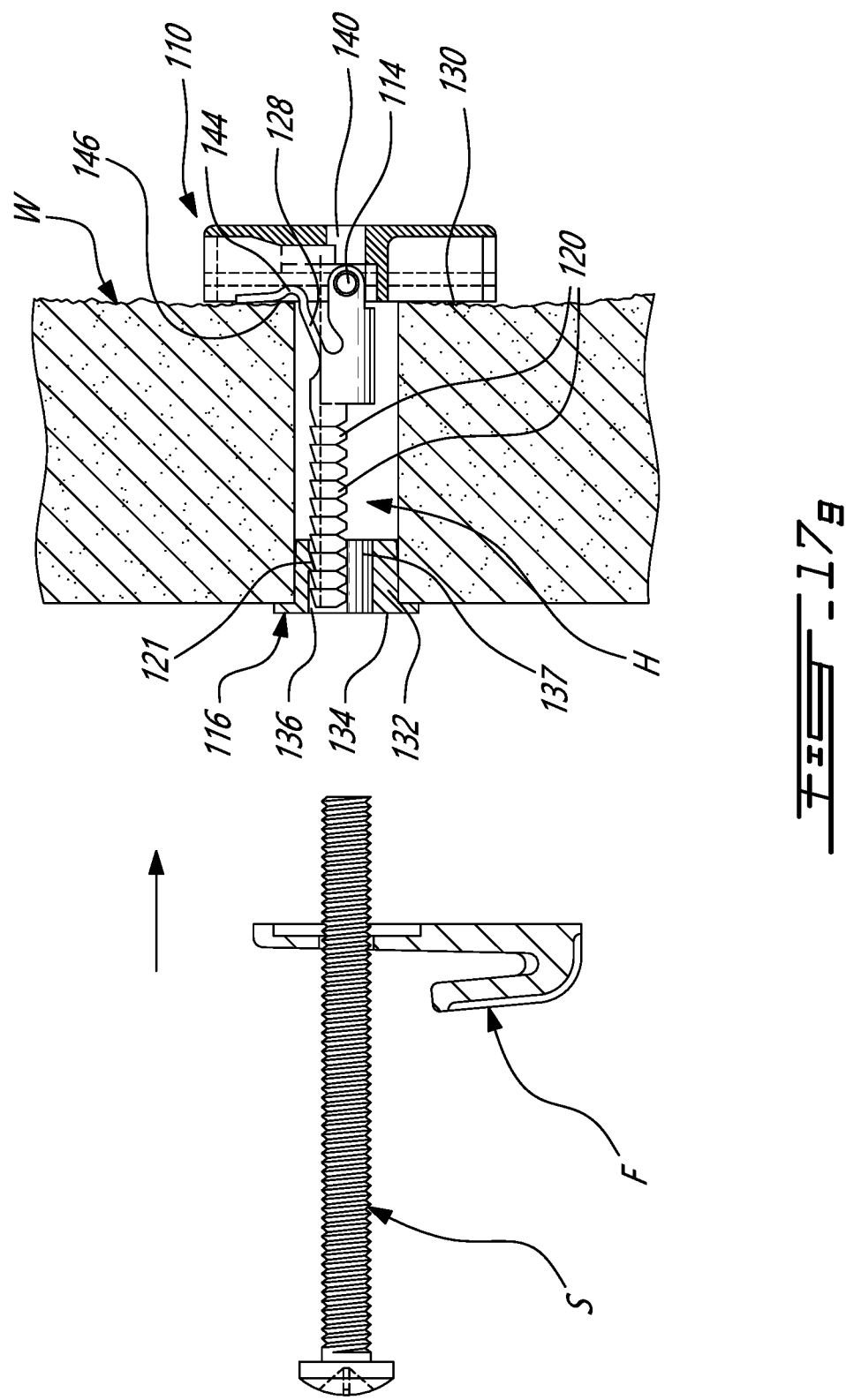

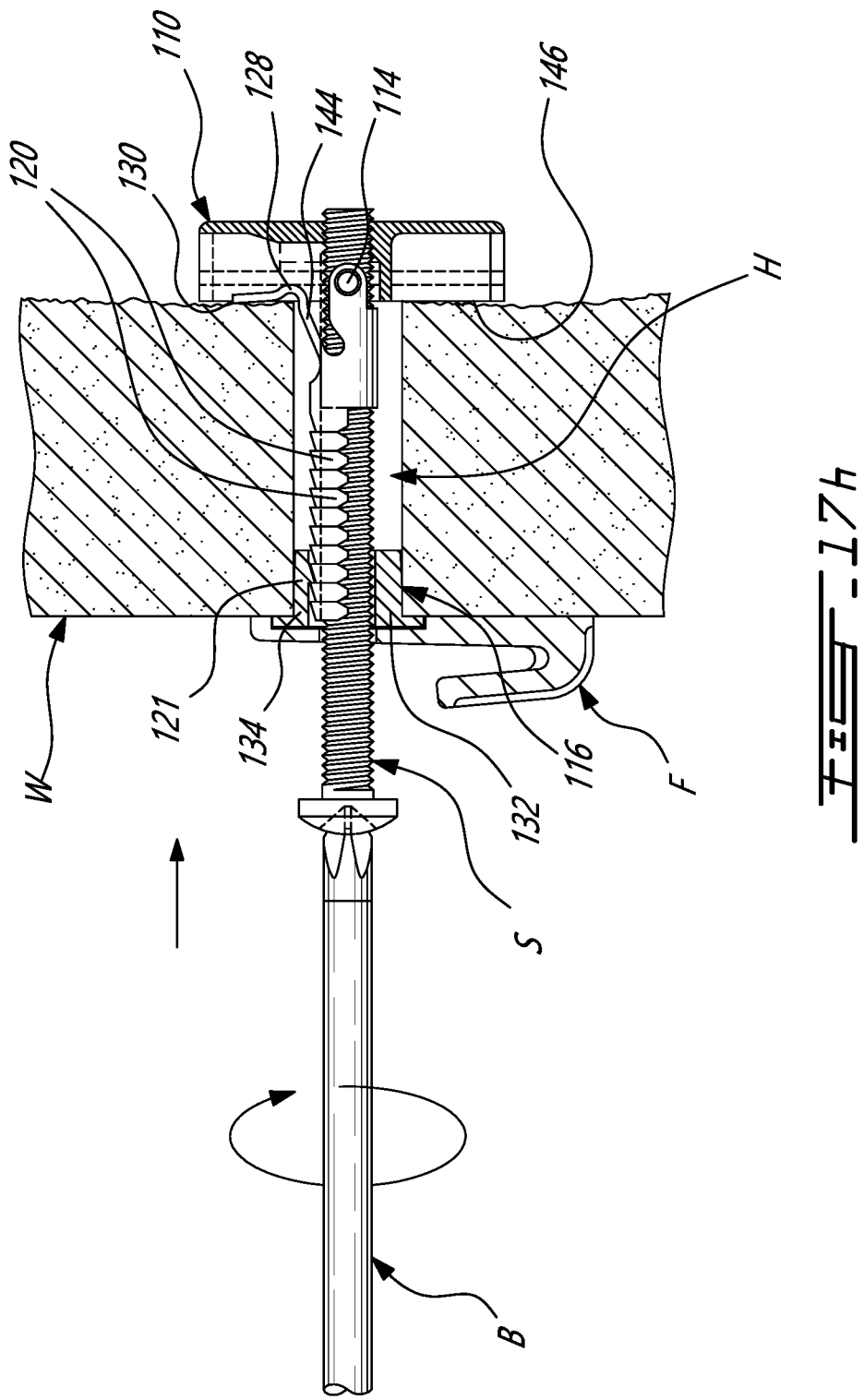

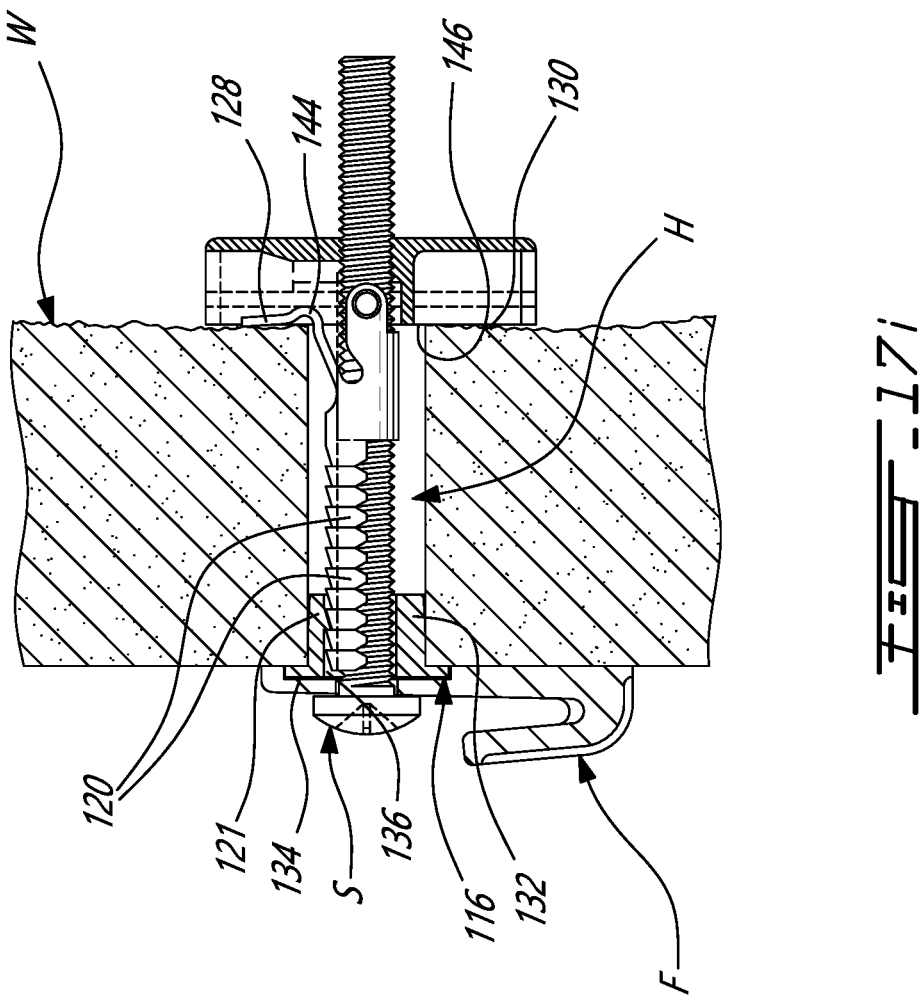

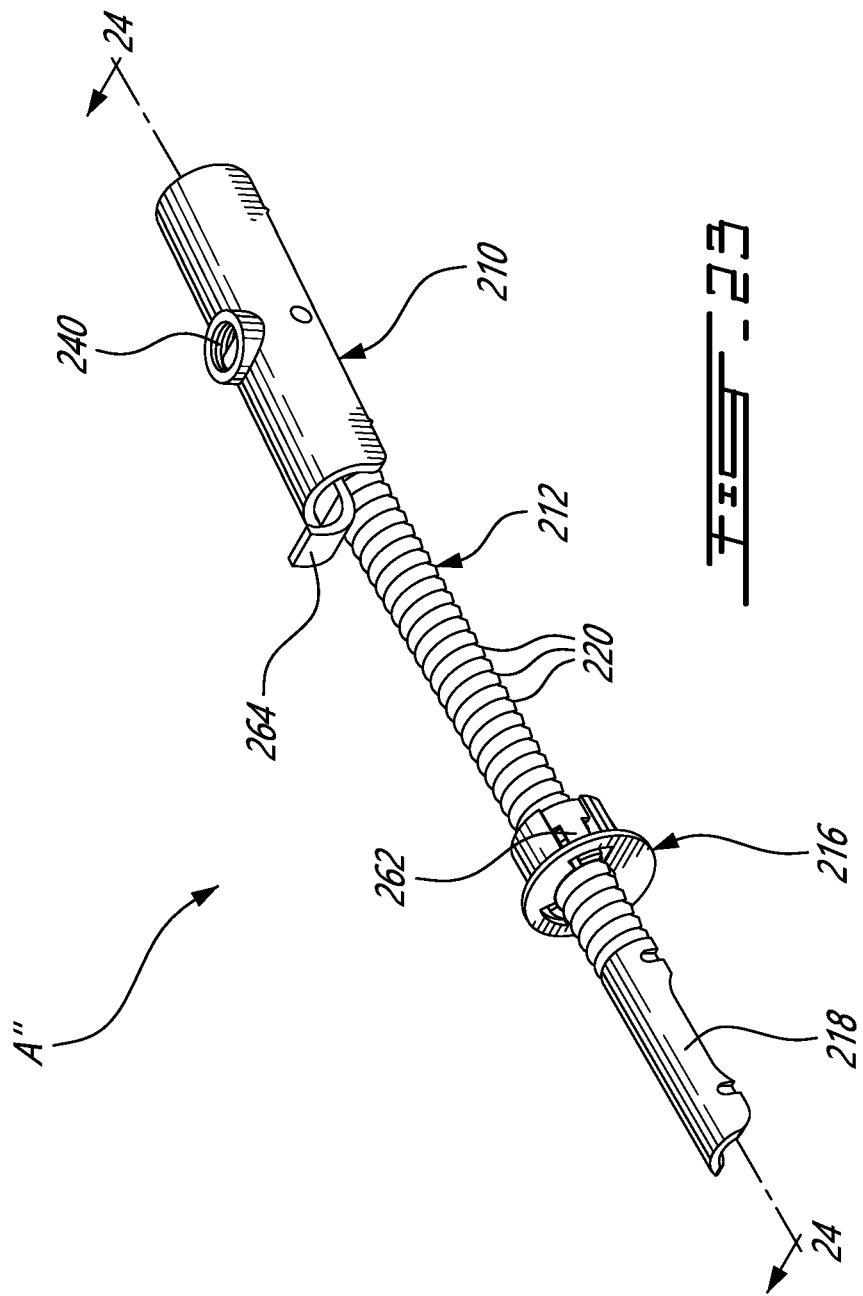

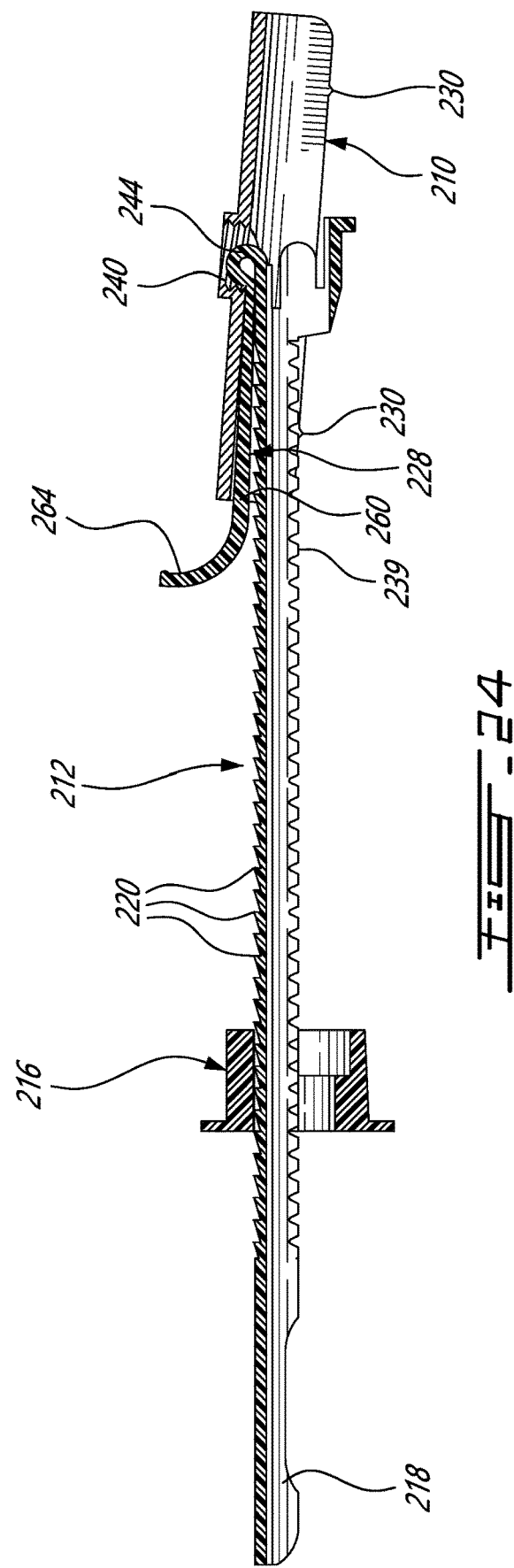

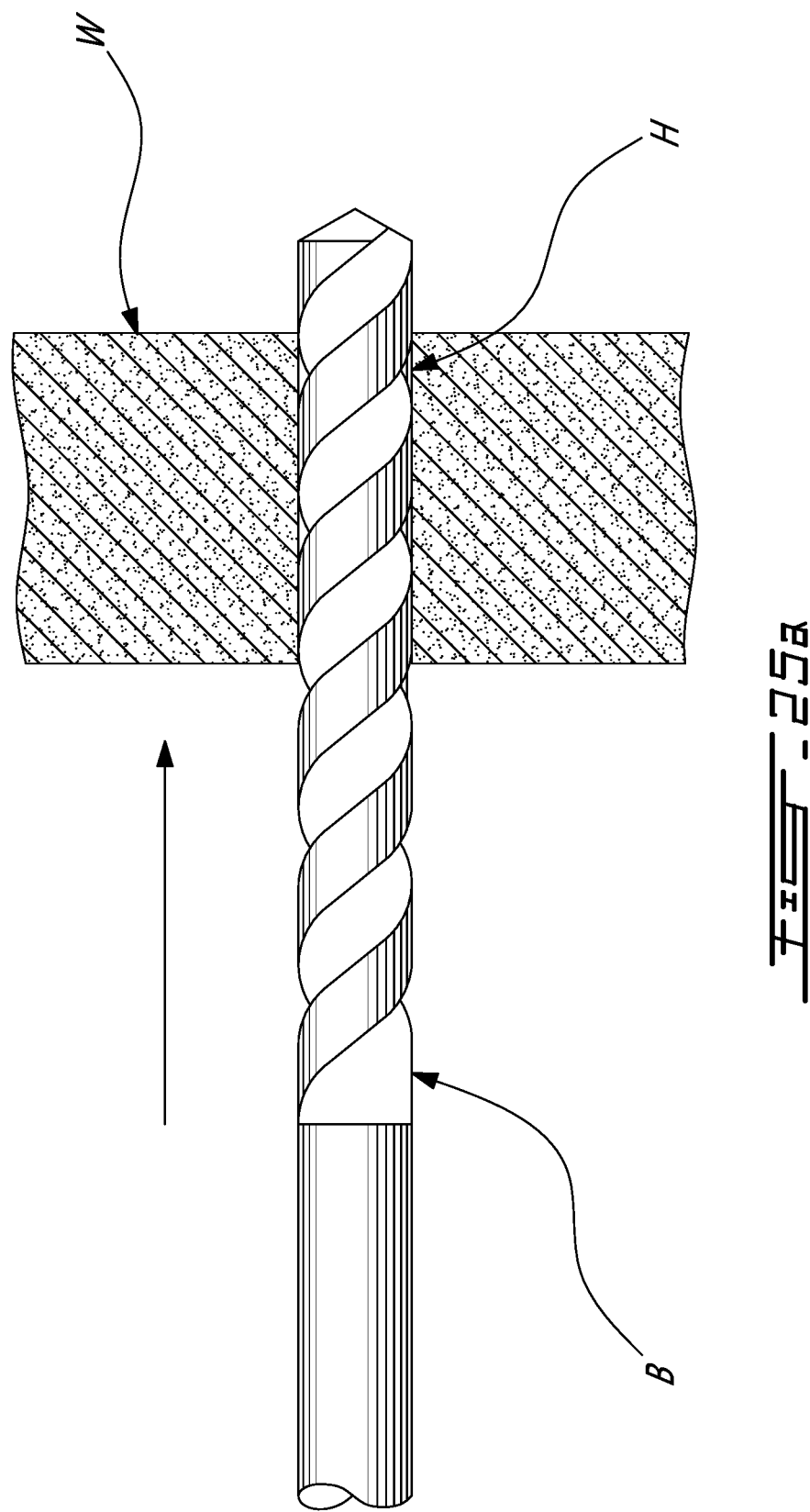

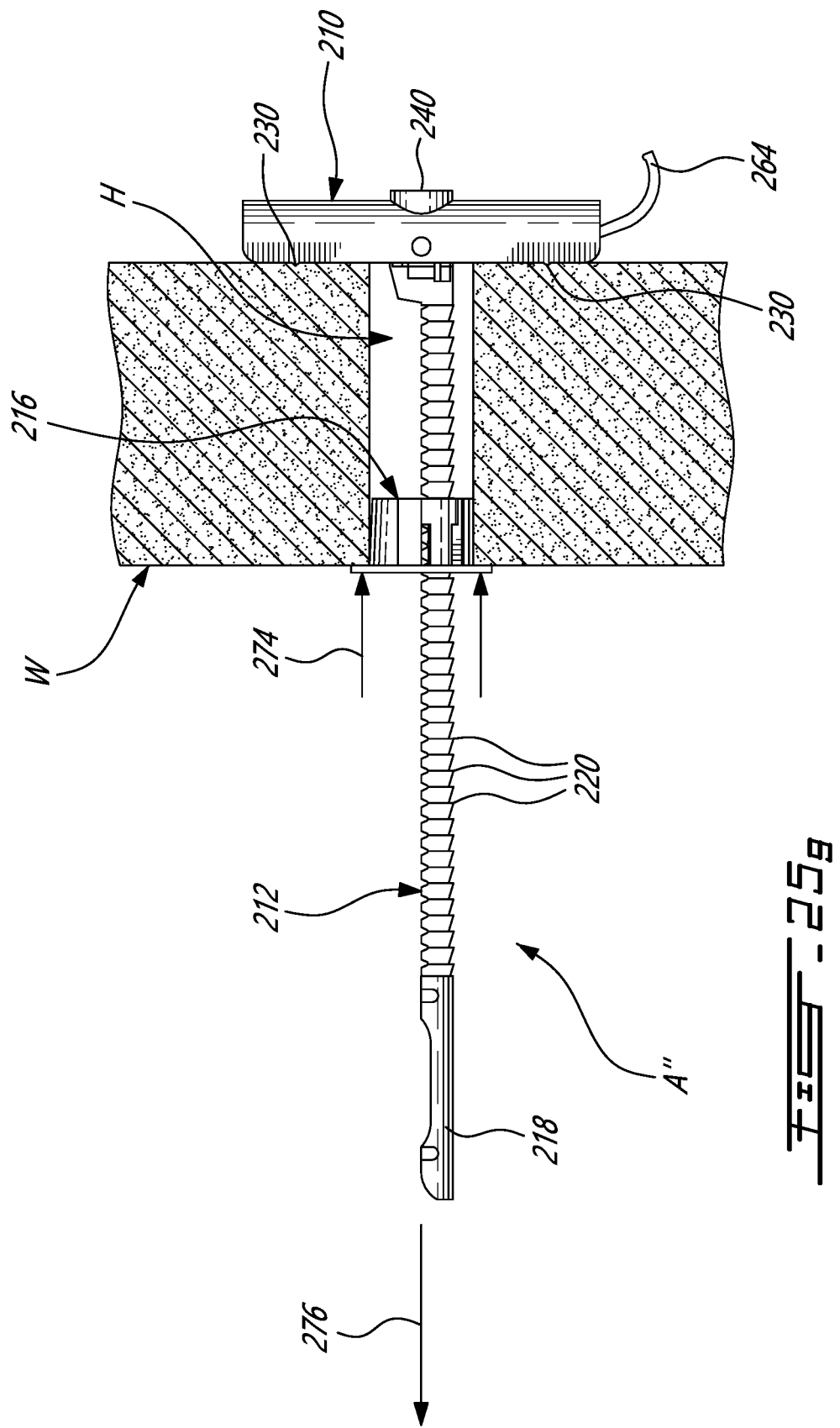

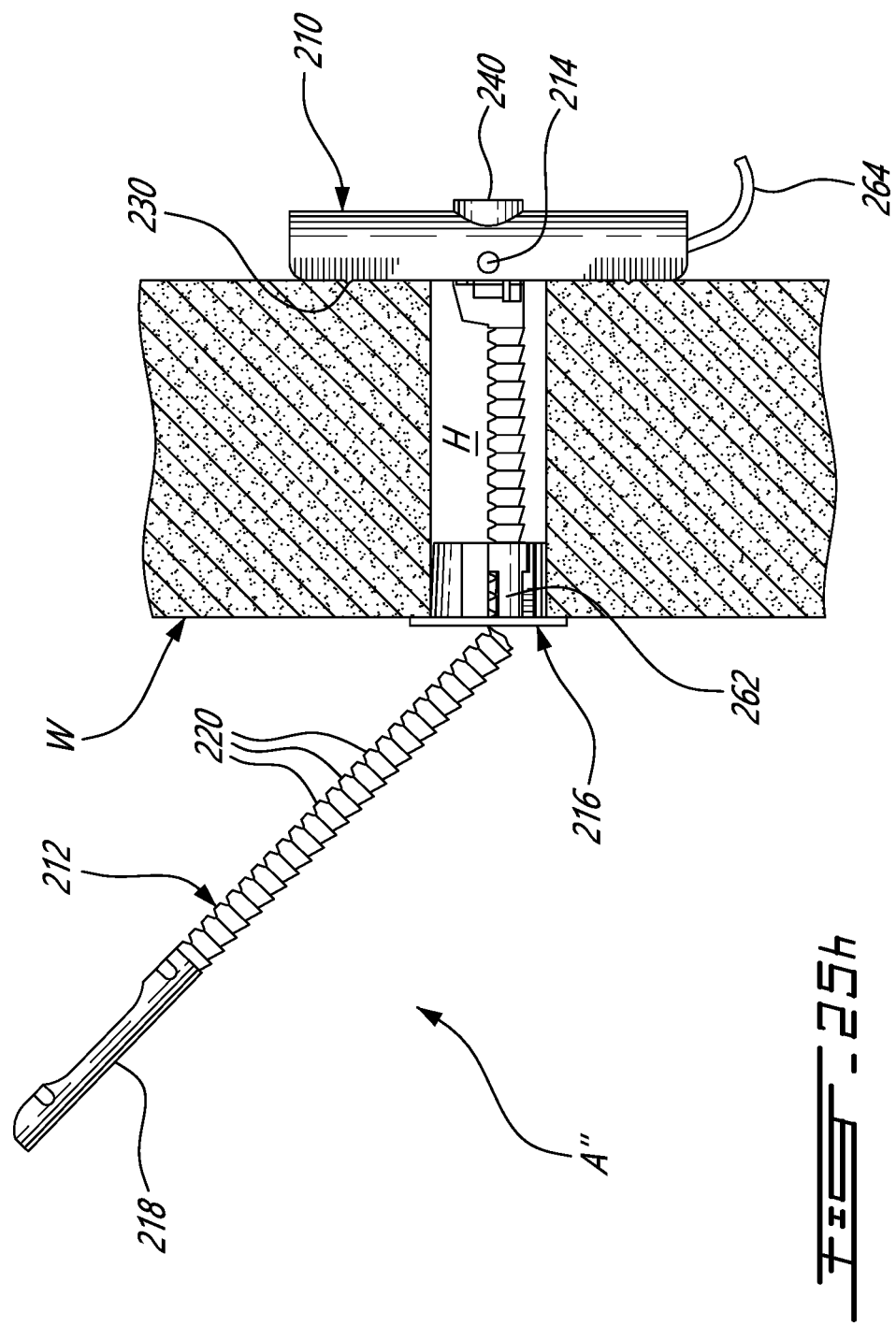

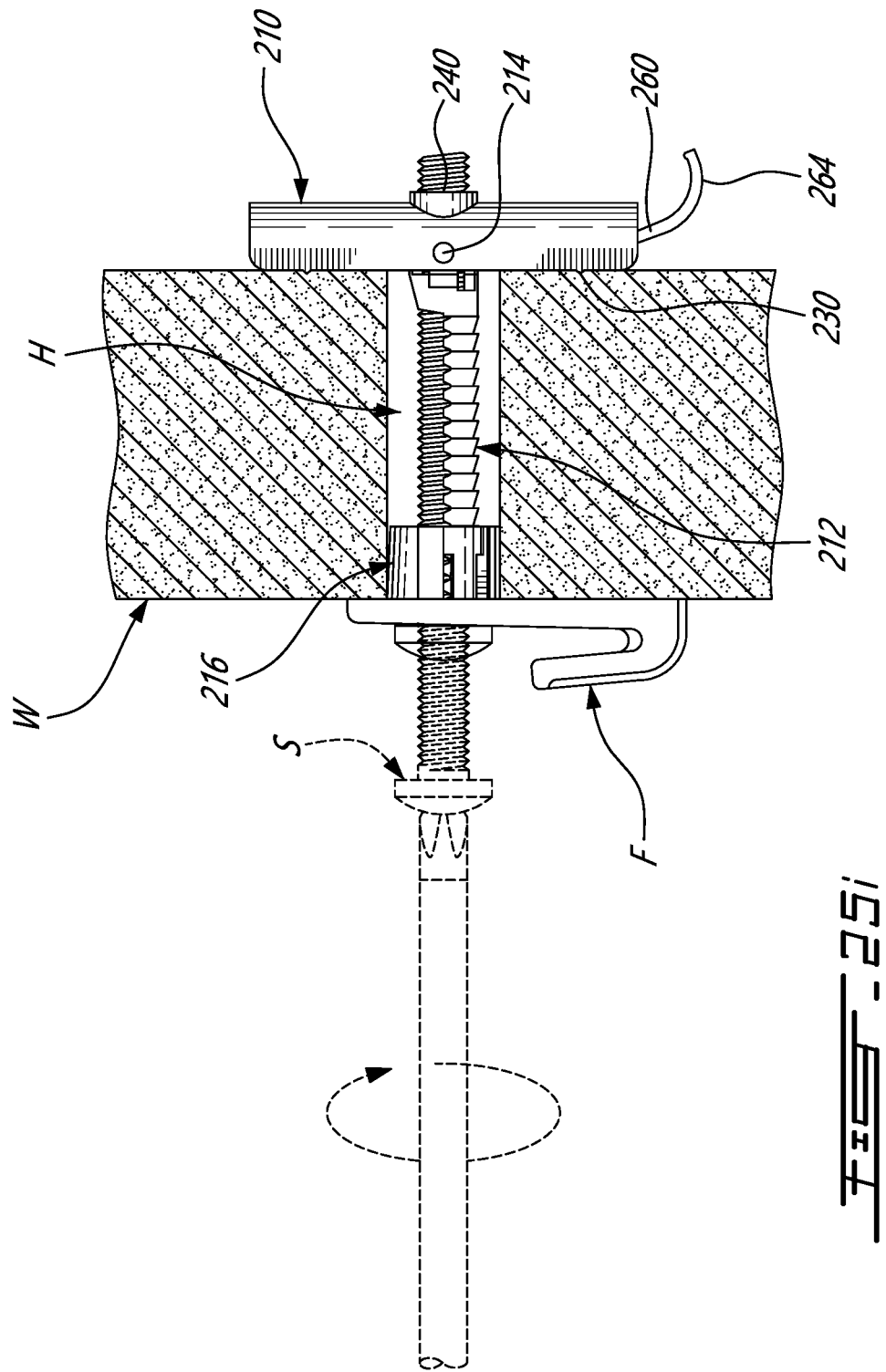

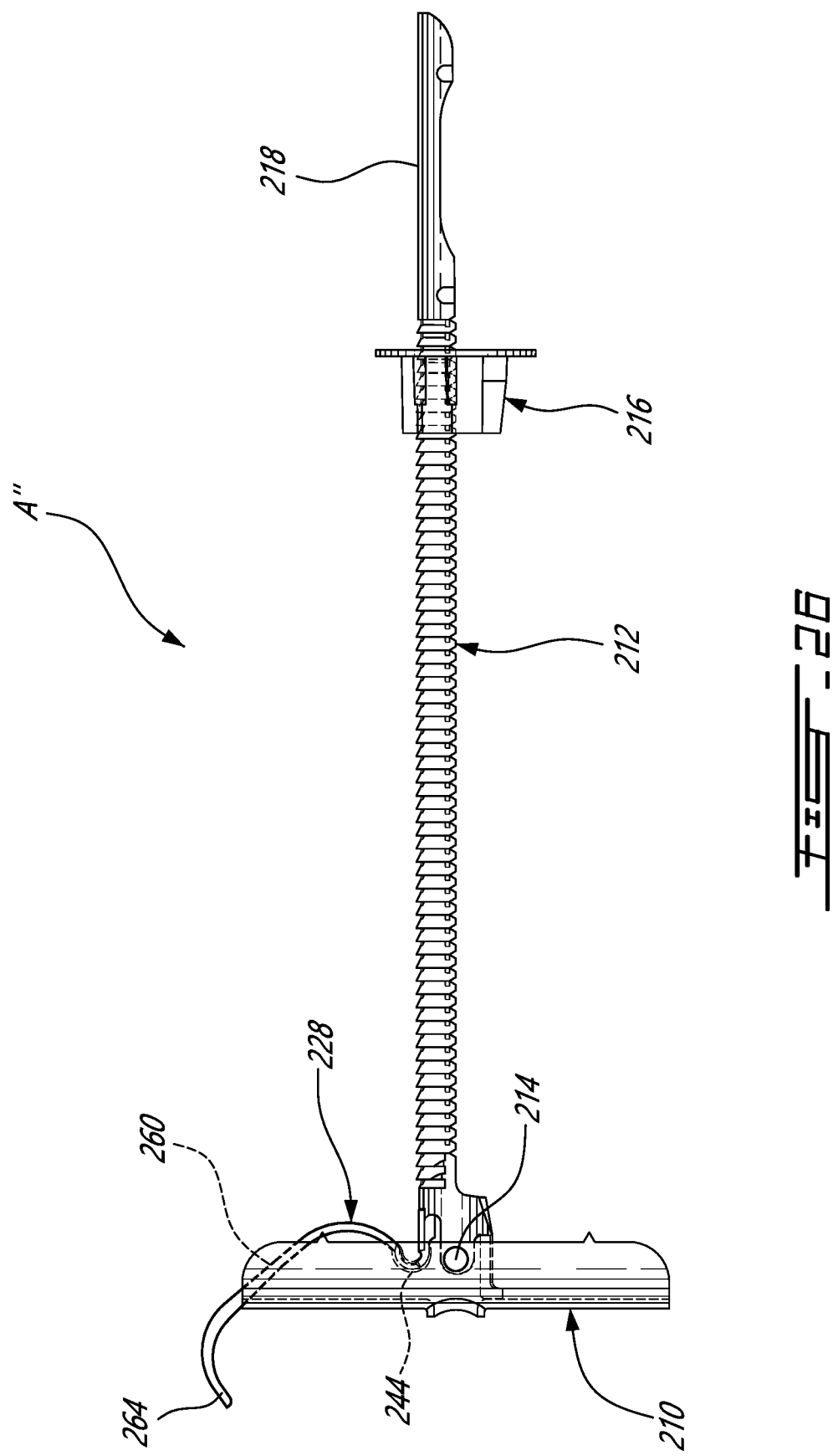

ANCHOR ASSEMBLY FOR FASTENER

CROSS REFERENCE TO RELATED APPLICATIONS

This Application is a national stage entry of and claims priority to International Application No. PCT/CA2016/000302, filed on Dec. 8, 2016, entitled Anchor Assembly For Fastener, which International Application was published as WO 2018/102902-A1 on Jun. 14, 2018. International Application No. PCT/CA2016/000302 is herein incorporated by reference in its entirety.

FIELD

The present subject-matter relates to wall anchors and, more particularly, to a wall anchor for use typically in hollow walls, such as those made of friable materials, e.g. gypsum.

BACKGROUND

U.S. Pat. No. 4,294,156 issued on Oct. 13, 1981 to McSherry et al. discloses an anchor assembly for retaining an elongated fastener within an opening defined in a wall. The anchor assembly includes a channel member acting as a toggle, and a pair of straps extending from the channel member and being pivotally mounted thereto. A pulling ring is provided at the ends of the straps opposite their ends connected to the channel member. A collar is engaged around the two straps and can be displaced, ratchet-type, towards the channel member. A hole is first defined through the wall and the channel member, oriented parallel to the straps is inserted through the hole such as to extend behind the wall, the channel member adopting once having passed the opening in the wall an orientation generally perpendicular to the straps and lying against the hidden surface of the wall after the straps have been pulled on via the pulling ring. The collar is then displaced along the straps and towards the wall until it firmly abuts the visible surface of the wall, the wall being imprisoned between the channel member and the collar which are connected by the straps. The pulling ring and the sections of the straps which extend forwardly of the collar can then be cut and a fastener can then be engaged through the collar and through a threaded opening defined in the channel member thereby allowing the fastener to be secured to the wall and to hold an article thereto.

U.S. Pat. No. 4,075,924 issued on Feb. 28, 1978 and U.S. Pat. No. 4,650,386 issued on Mar. 17, 1987, both to McSherry et al., are also of interest.

SUMMARY

It would thus be desirable to provide a novel anchor assembly typically for use with a fastener in hollow walls.

The embodiments described herein provide in one aspect an anchor assembly for walls, comprising a strap member, a spring member, a toggle member pivotally mounted to said strap member, and a locking member slidable along said strap member, said toggle member being displaceable between first and second positions thereof, wherein in said first position said toggle member is substantially aligned with said strap member for insertion through a hole in the wall while biasedly engaging said spring member, wherein in the first position the toggle member is engaged to the strap member, wherein said toggle member once behind the wall is adapted to be displaced towards said second position by said spring member, and wherein in said second position said toggle member extends behind the wall at an angle relative to said strap member with said strap member extending from said toggle member through the hole in the wall, said locking member being adapted to be displaced along said strap member and towards the wall and said toggle member, whereby once the anchor assembly is installed, said locking member and said toggle member are connected by a distal section of said strap member and imprison the wall by abutting opposed sides thereof, said toggle member being adapted to be engaged by a fastener introduced through said locking member and through the hole in the wall.

BRIEF DESCRIPTION OF THE DRAWINGS

For a better understanding of the embodiments described herein and to show more clearly how they may be carried into effect, reference will now be made, by way of example only, to the accompanying drawings, which show at least one exemplary embodiment, and in which:

FIGS. 4 and 5 are top plan views of the anchor assembly of FIG. 1 with the toggle member shown respectively in the first and second positions thereof;

FIGS. 6 and 7 are respectively side elevational and rear elevational views of the anchor assembly of FIG. 5;

FIGS. 8 to 13 are various views of a toggle member, a strap member and a locking member of the anchor assembly;

FIGS. 17a to 17i are successive partly cross-sectional schematic side views showing the installation of the anchor assembly of FIGS. 14 to 16 into a wall;

FIG. 23 is a perspective view of the anchor assembly of FIG. 18 and with the toggle member shown in an insertion position thereof;

FIG. 24 is a longitudinal cross-sectional view taken along line 24-24 of FIG. 23, showing the anchor assembly of FIG. 23 with the toggle member shown in the insertion position thereof;

FIGS. 25a to 25i are successive partly cross-sectional schematic side views showing the installation of the anchor assembly of FIGS. 18 to 24 into a wall;

FIG. 26 is a side view of the anchor assembly of FIG. 18 and with the toggle member shown in an at-rest, i.e. retention, position thereof, and with the toggle member and collar being shown transparent for illustrating purposes such as to detail interactions thereof with the strap member;

DESCRIPTION OF VARIOUS EMBODIMENTS

Figure 1:
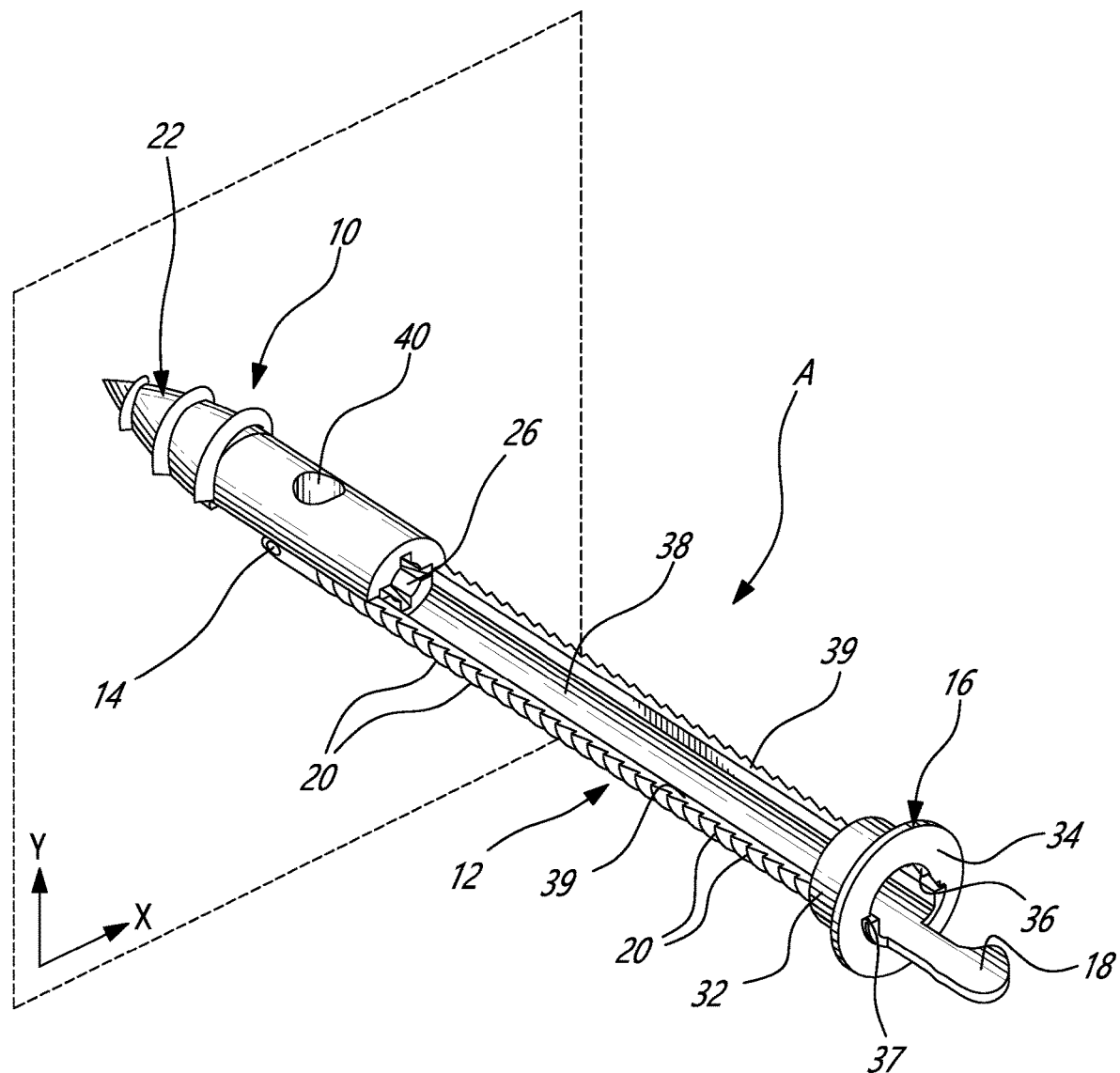
FIG. 1 is a perspective view of an anchor assembly in accordance with a first exemplary embodiment, and showing a toggle member of the anchor assembly in a first insertion position thereof, a wall being schematically shown in phantom lines.
Figure 2:
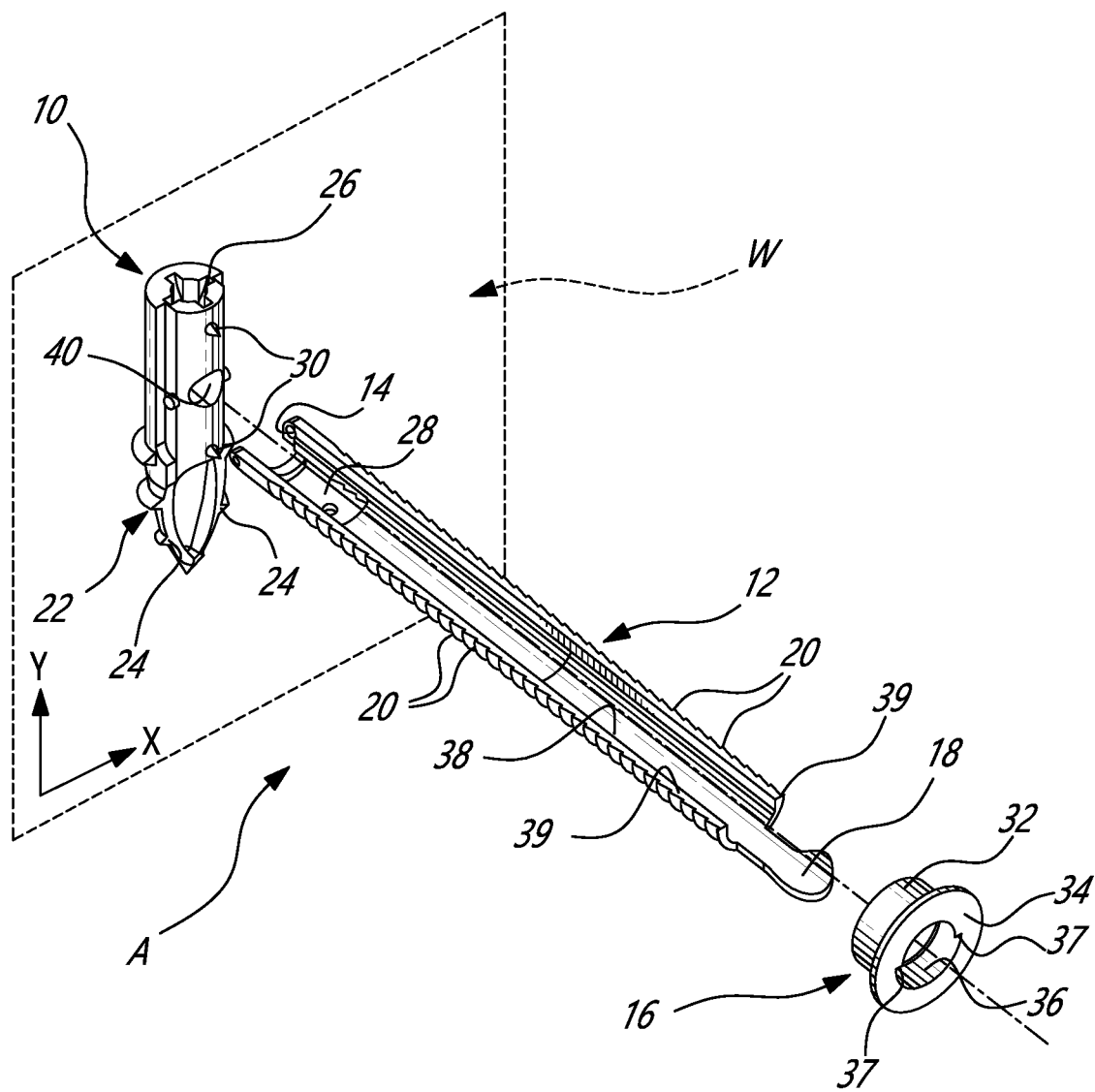
FIG. 2 is an exploded perspective view of the anchor assembly of FIG. 1, and showing the toggle member in a second retention position thereof.
Figure 3:
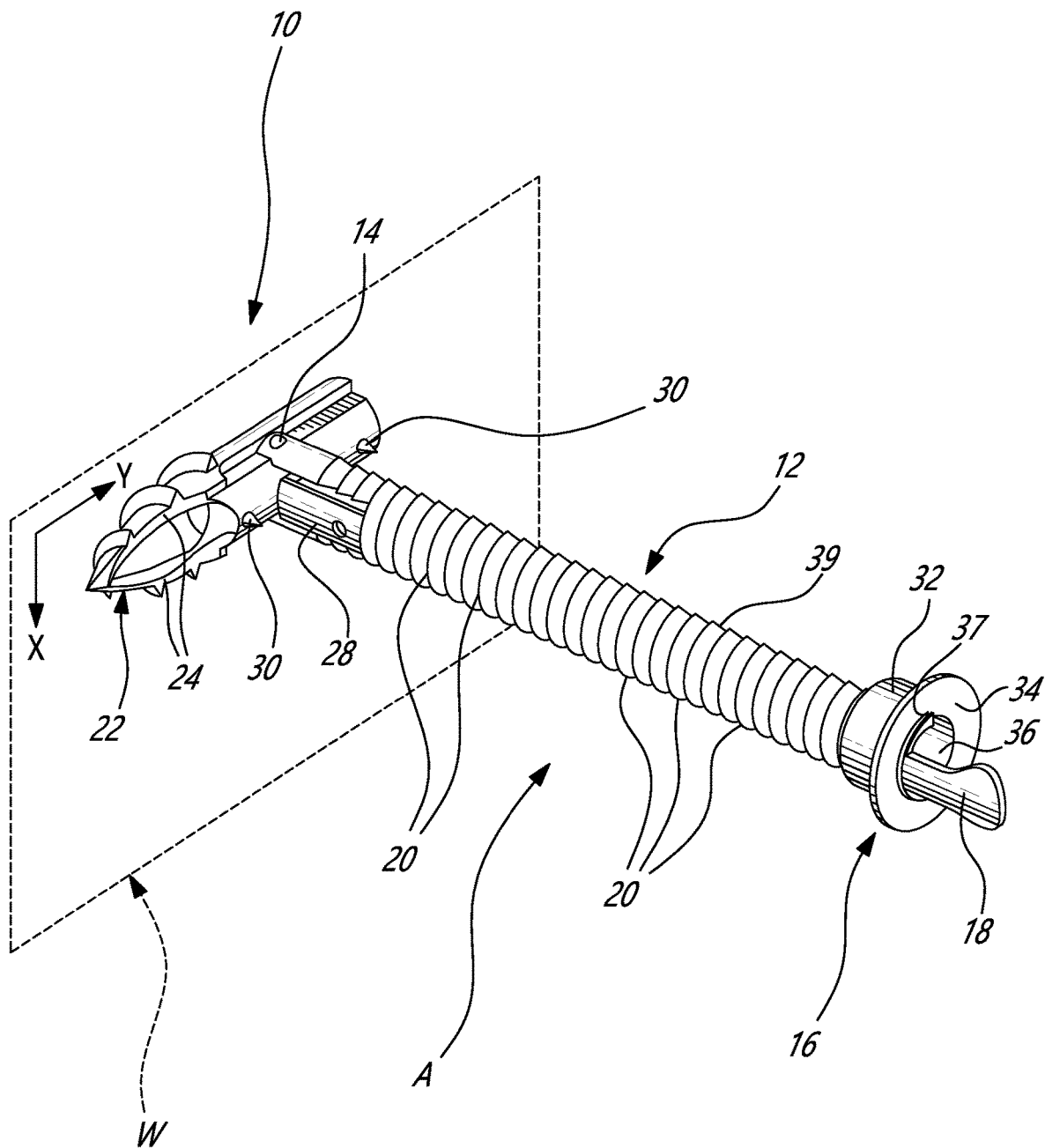
FIG. 3 is a perspective view of the anchor assembly of FIG. 1 with the toggle member shown in the second position thereof.
Figure 11:
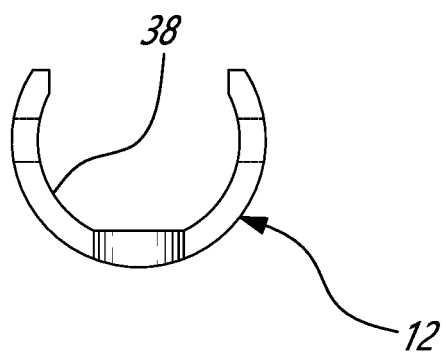
Figure 12:
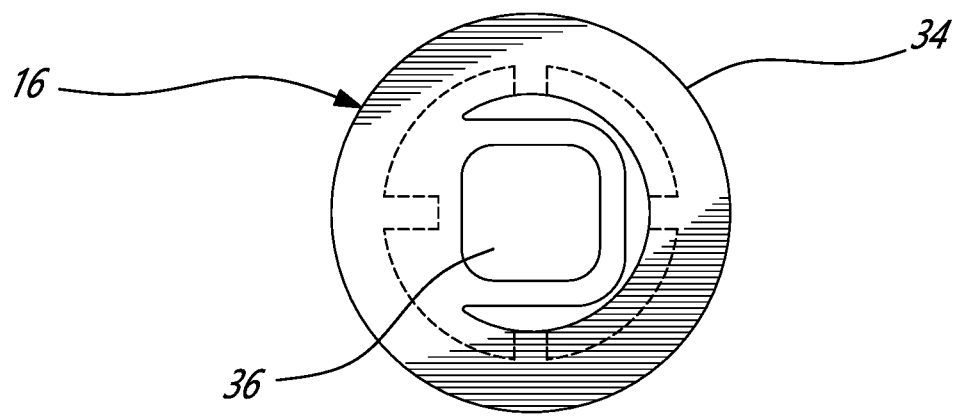
Figure 13:
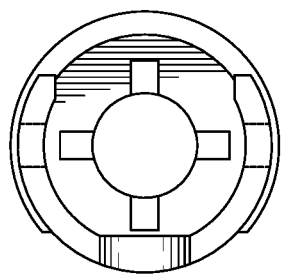

FIGS. 1 to 3 illustrate an anchor assembly A, which is adapted to be mounted to a wall W for use with a fastener (not shown), such as a screw. The anchor assembly A comprises a cutting and retention member 10 hereinafter referred to as the toggle member 10, a strap member 12 pivotally connected at pivot 14 to the toggle member 10, and a locking member, such as collar 16. The strap member 12 is thus pivotally connected at its rear end to the toggle member 10 and is provided at its front end with a grip member 18. The strap member 12, preferably made of plastic, is of substantially semi-circular cross-section and defines a series of ratchet teeth 20 on an outside surface thereof. The collar 16 is displaceable along the strap member 12, that is only towards the toggle member 10, the collar 16 including inner locking elements 21 (FIGS. 4 to 6) which co-act with the ratchet teeth 20 in order to prevent the collar 16 from being displaced away from the toggle member 10.

The toggle member 10 defines at a leading, i.e. rear, end thereof a threaded cutting member 22 defining a pointed end and cutting edges 24 for cutting through a friable wall W material when the toggle member 10 is rotated using, for instance, a screwdriver while the toggle member 10 is in its position shown in FIG. 1, that is in a generally aligned position thereof with respect to the strap member 12. In fact, the toggle member 10 does not have to be in the aligned position at least during insertion of the threaded cutting member 22 into the wall W, and generally until the forward end of the strap member 12 abuts, or is close to, the visible side of the wall W.

Accordingly, a proximal, i.e. trailing, end of the toggle member 10 defines a cruciform recess 26 adapted to be engaged by a Phillips-type screwdriver. It is understood that other types of female recesses or even male extensions, engageable respectively by suitable screwdriver bits or by suitable rotatable sockets, could also be used.

A spring-loaded tab 28 is provided at the rear, i.e. leading, end of the strap member 12 such as to be engaged by the toggle member 10 when the latter is aligned, as in FIG. 1, with the strap member 12, such that once the toggle member 10 has been inserted completely through the wall W, the spring-loaded tab 28 biasedly releases the toggle member 10 to its transversal retention position shown in FIG. 2. The toggle member 10 also includes pointed teeth 30 adapted to engage the hidden side of the wall W when the strap member 12 is pulled on.

Accordingly, when it is desired to install the anchor assembly A in the wall W, the toggle member 10 is substantially brought into alignment with the strap member 12, as shown in FIG. 1. Then, a suitable tool, such as a screwdriver or a power driven screwdriver bit, is engaged in the cruciform recess 26 of the toggle member 10 and is then rotated such that the cutting member 22 of the toggle member 10 defines a hole in the wall W. Once the toggle member 10 has been inserted completely through the wall W, the spring-loaded tab 28 of the strap member 12 swings the toggle member 10 to its transversal position shown in FIGS. 2 and 3, that is generally perpendicular to the strap member 12.

The strap member 12 is then pulled away from the wall W, such that the pointed teeth 30 of the toggle member 10 engage the hidden surface of the wall W. The collar 16 is then slid towards the wall W along the ratchet teeth 20 of the strap member 12 that is until a skirt 32 of the collar 16 is inserted in the hole defined in the wall W, and a flange 34 of the collar 16 abuts the visible side of the wall W. The grip member 18 is held onto by the user while the collar 16 is displaced towards the wall W. The collar 16 is slid longitudinally along the strap member 12, and without being able to rotate with respect to the strap member 12 as a result of the non-circular opening 36 defined in the collar 16, which defines shoulders 37 (FIGS. 1 to 3) that are engaged by the longitudinal edges 39 of the strap member 12, as best seen in FIG. 1.

Once the wall W is firmly imprisoned between the toggle member 10 and the collar 16, the grip member 18 and the section of the strap member 12 extending between the grip member 18 and the flange 34 of the collar 16, can be discarded, for instance, by cutting or, as in the present embodiment, by bending as the strap member 12 is provided with weakened areas which allow the strap member 12 to be separated in two. The remaining portion of the strap 12 thus connects the toggle member 10 to the collar 16 within the hole in the wall W.

A fastener can then be engaged through the central opening 36 defined in the collar 16, within a semi-circular channel 38 defined longitudinally along the strap member 12, and through an opening 40 defined in the toggle member 10. The opening 40 in the toggle member 10 may be, for instance, tapped by the fastener such that the fastener becomes firmly secured to the anchor assembly A which itself is firmly secured to the wall W, as explained hereinabove. If the opening 40 is provided with a machine tap, a bolt can be used as the fastener. If the fastener is provided at its head, for instance, with a hook, the anchor assembly A can be used in a ceiling.

Figure 14:
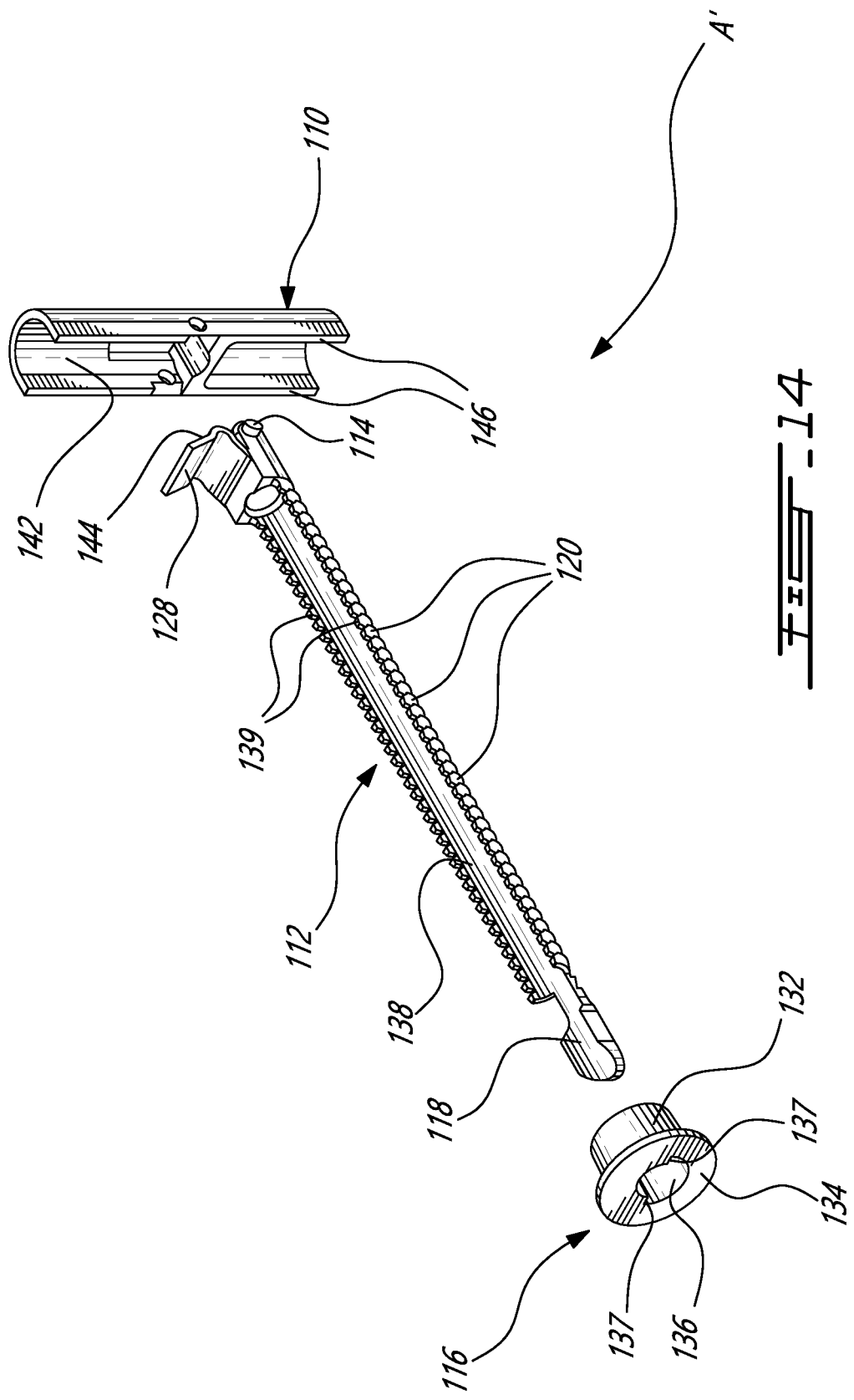
FIG. 14 is an exploded perspective view of an anchor assembly in accordance with a second an exemplary embodiment, and showing a toggle member of the anchor assembly in a retention position thereof.
Figure 15:
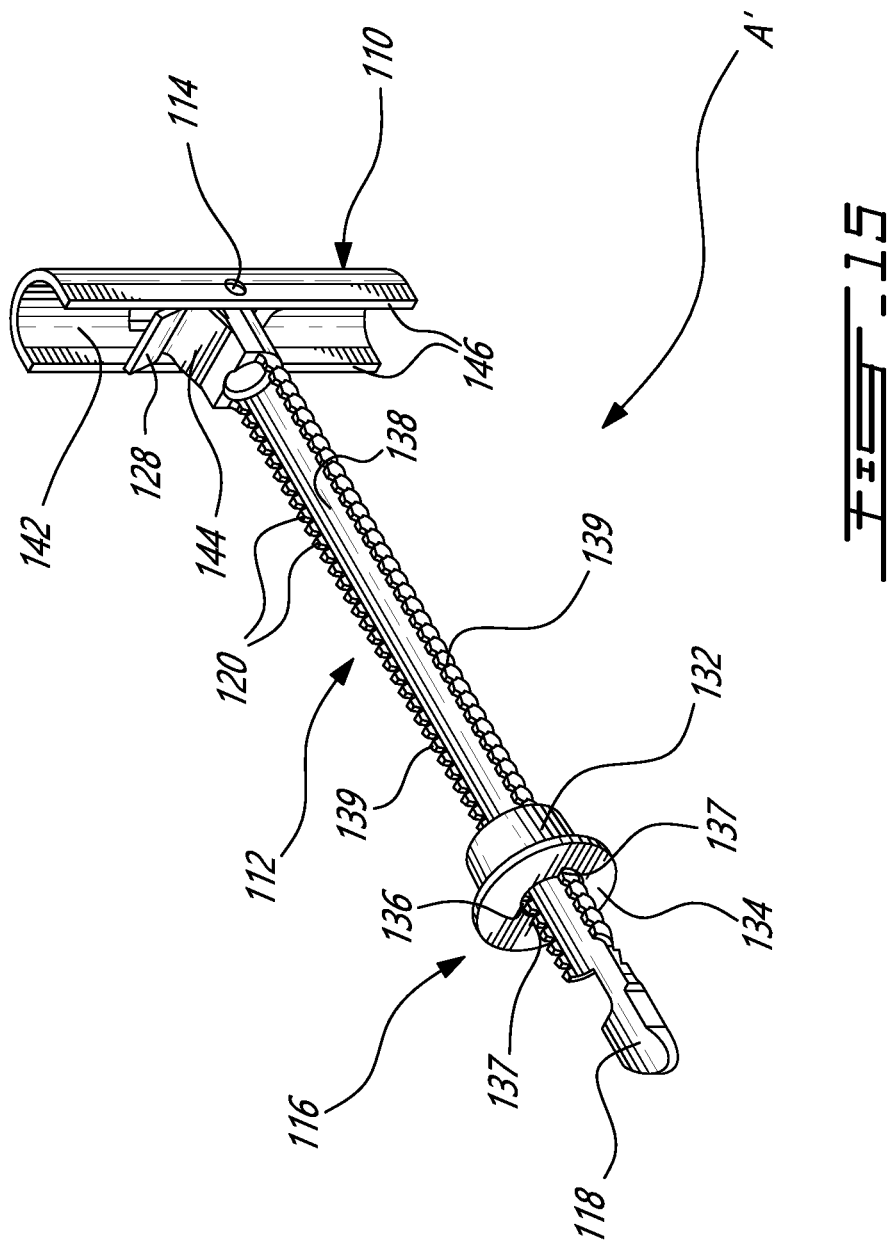
FIG. 15 is a perspective view of the anchor assembly of FIG. 14, and with the toggle member shown in the retention position thereof.
Figure 16:
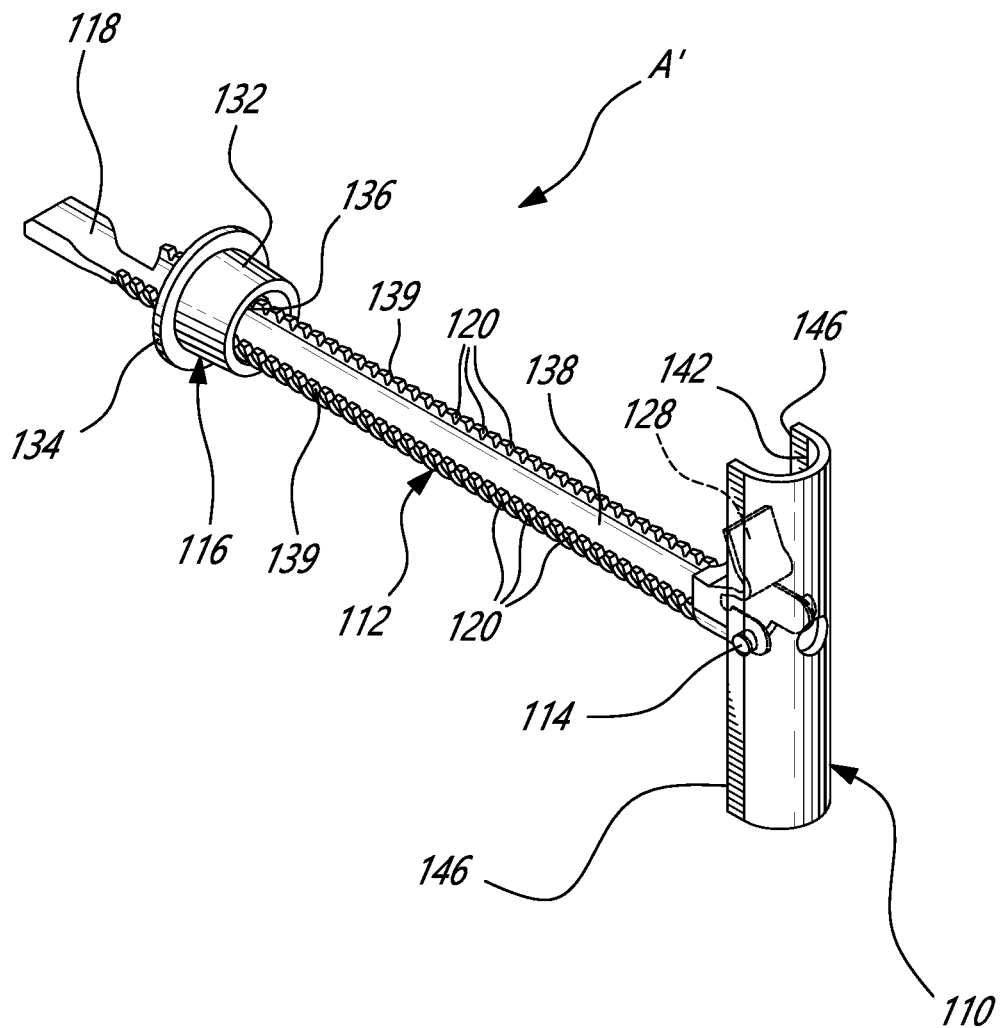
FIG. 16 is a further perspective view of the anchor assembly of FIG. 14 and with the toggle member shown in the second position thereof.

FIGS. 14 to 16 illustrate a variant anchor assembly A', which is similar to the anchor assembly A of FIG. 1, whereby in the following description and drawings that pertain thereto, components of anchor assembly A' which are identical in function and identical and/or similar in structure to corresponding components of anchor assembly A of FIG. 1 (and FIGS. 2 to 13) bear the same reference as in FIG. 1 (and FIGS. 2 to 13), but are tagged with the prefix "1" and are thus in the hundreds with the last two digits thereof being identical to the reference numerals of corresponding components of anchor assembly A. New components (or components not identified for anchor assembly A) provided in anchor assembly A' start at reference numeral 142.

Generally, both anchor assemblies A and A' are very similar, except for their toggle members, as explained hereinbelow. The anchor assembly A' is also adapted to be mounted to a wall for use with a fastener (not shown), such as a screw. The anchor assembly A' comprises a retention member 110 hereinafter referred to as the toggle member 110, a strap member 112 pivotally connected at pivot 114 to the toggle member 110, and a locking member, such as collar 116. The strap member 112 is thus pivotally connected at its rear, leading, end to the toggle member 110 and is provided at its front end with a grip member 118.

The strap member 112, preferably made of plastic, is of substantially semi-circular cross-section and defines a series of ratchet teeth 120 on an outside surface thereof. The collar 116 is displaceable along the strap member 112, that is only towards the toggle member 110, the collar 116 including inner locking elements (not shown) which co-act with the ratchet teeth 120 in order to prevent the collar 116 from being displaced away from the toggle member 110, i.e. from being retracted back towards the grip member 118.

The toggle member 110, as opposed to the toggle member 10 of the anchor assembly A of FIG. 1, does not define at a leading end thereof a threaded cutting member. Therefore, in the case of the anchor assembly A', a hole must be formed, e.g. drilled, through the wall before the anchor assembly A' can be mounted thereto, as will be explained in more detail hereinafter. The toggle member 110 is of C-shaped cross-section such that an open side 142 thereof faces the collar 116, when the toggle member 110 is in the transversal retention position thereof shown in FIGS. 14 to 16.

A spring-loaded tab 128 is provided at the rear, i.e. leading, end of the strap member 112 such as to be engaged by the toggle member 110 when the latter is aligned with the strap member 112 (this position is generally shown in FIG. 1 with respect to anchor assembly A). Therefore, with the toggle member 110 and the strap member 112 in such a generally aligned insertion position, the toggle member 110 can be inserted through the wall.

Once the toggle member 110 has been introduced completely past the hidden surface of the wall, the spring-loaded tab 128 biasedly releases the toggle member 110 to its transversal retention position shown in FIGS. 14 to 16. The tab 128 includes a V-shaped tongue 144 that is forcibly folded or collapsed when the toggle member 110 is brought to the insertion position and that causes, as it plastically returns to its at-rest position (see FIGS. 14 to 16) the toggle member 110 to displace to its transversal retention position. Parallel and more importantly co-planar linear edges 146 of the toggle member 110 are adapted to bearably engage the hidden side of the wall when the strap member 112 is pulled on.

Figure 17A:
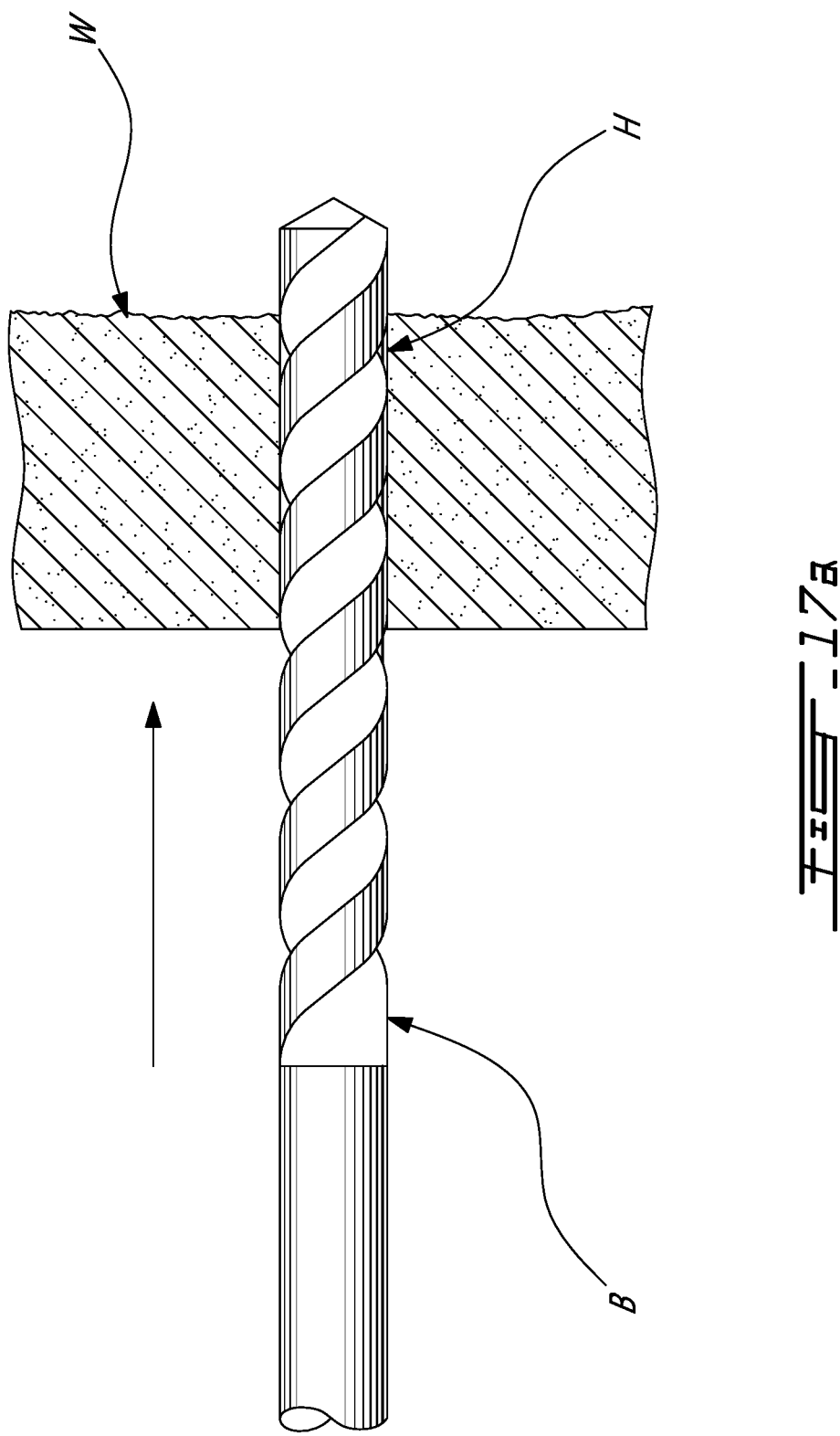
Figure 17B:
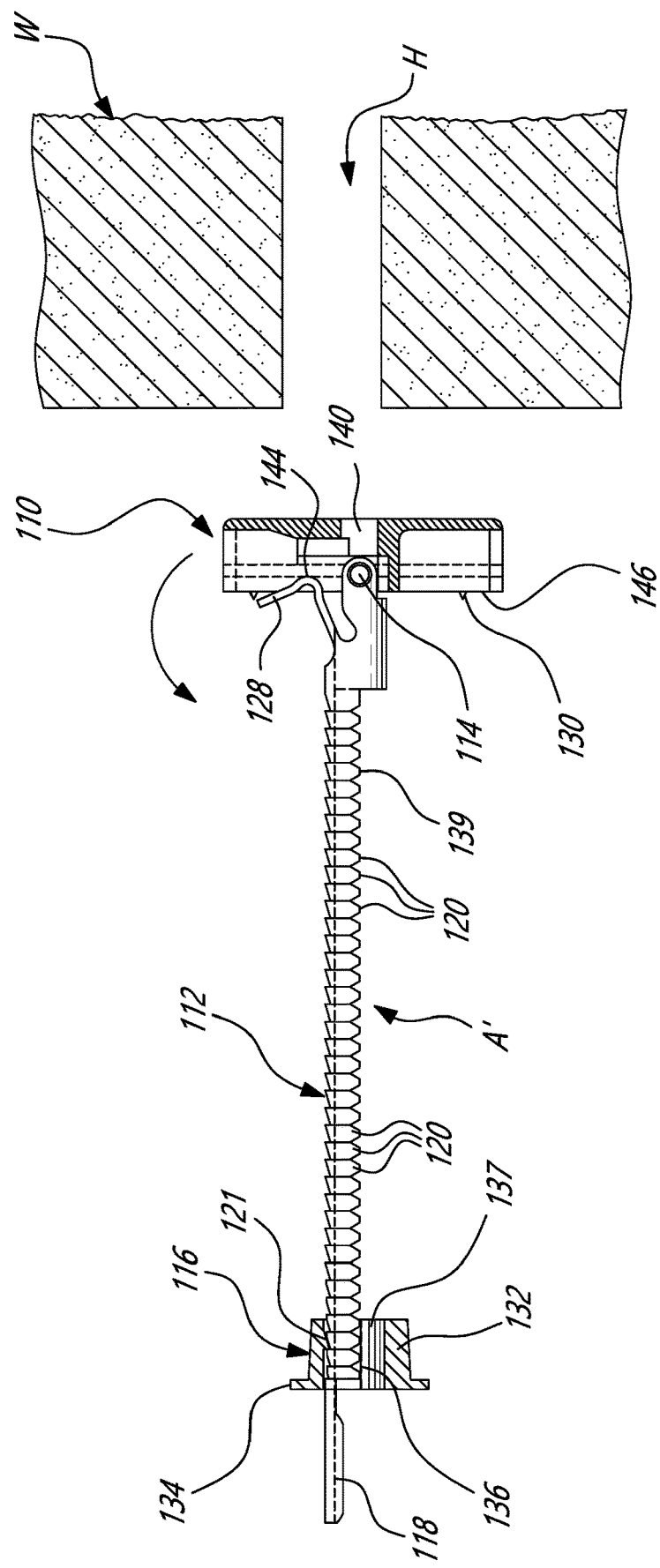
Figure 17C:
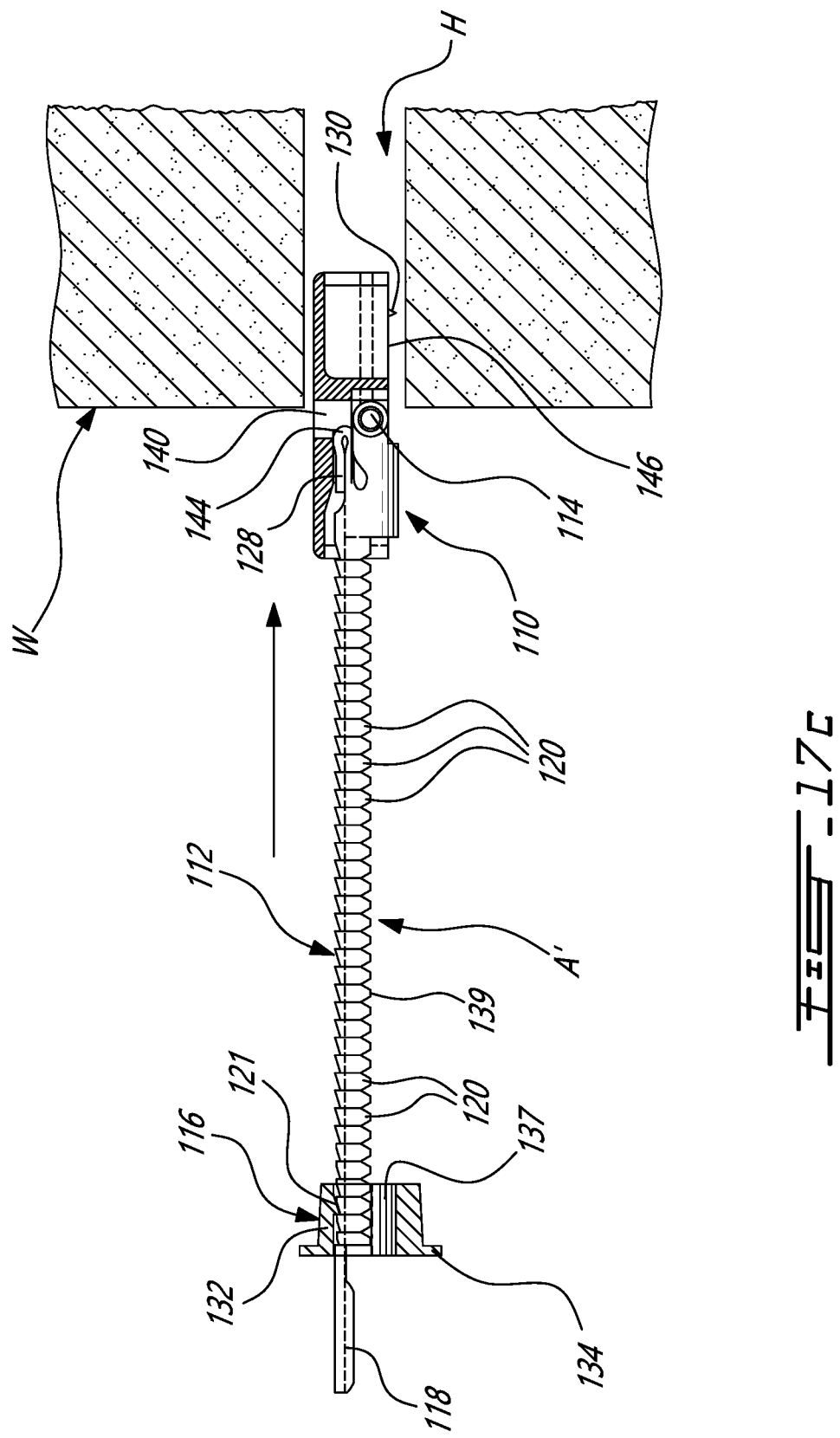
Figure 17F:
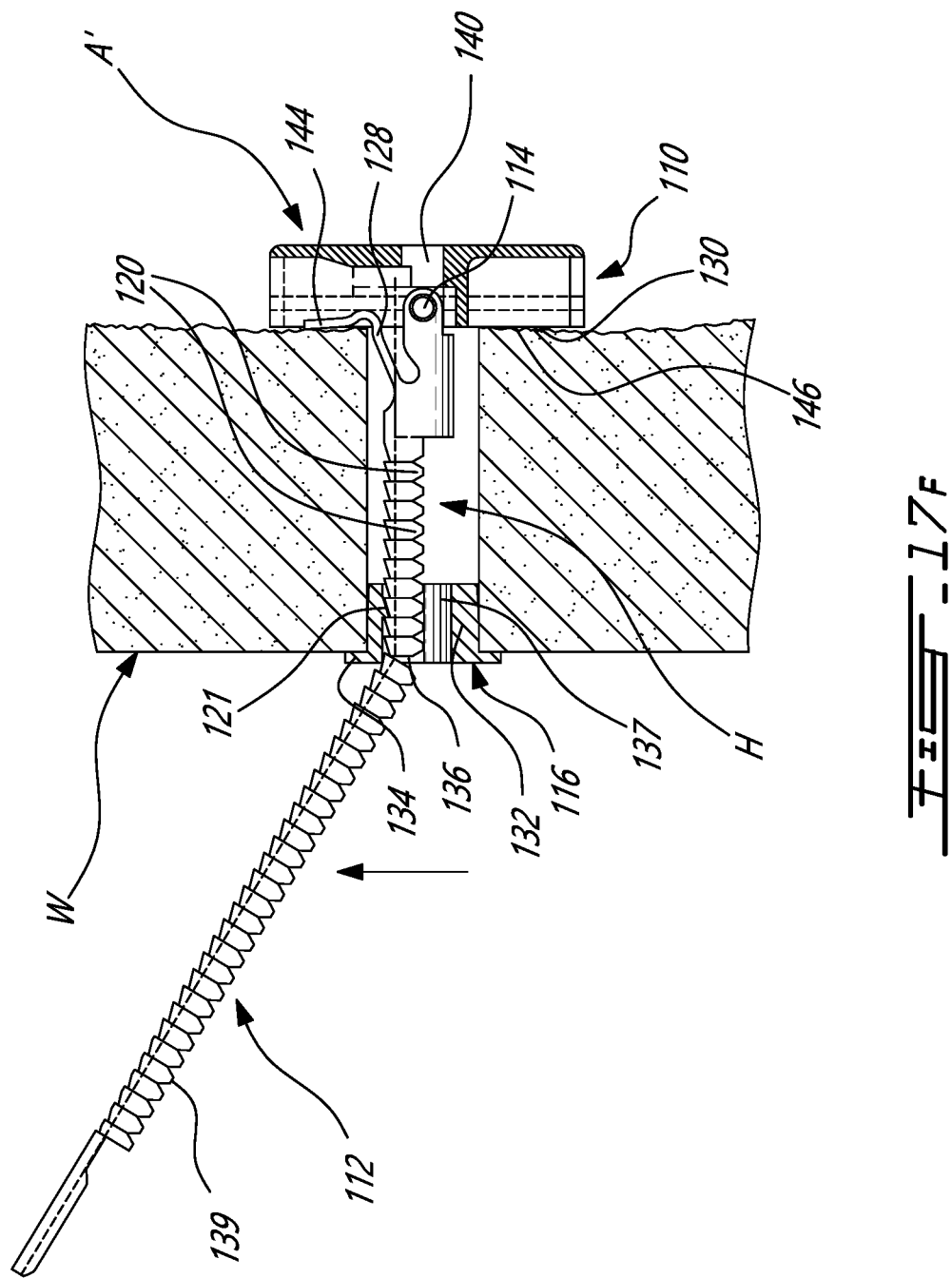

Accordingly, with reference to FIGS. 17a to 17i, when it is desired to install the anchor assembly A' in the wall W, a hole H is first formed through the wall W, using for instance a drill bit B (see FIG. 17a). The toggle member 110 is then substantially brought into alignment with the strap member 112 (as seen in FIG. 17b), against the bias of the spring-loaded tab 128, and is inserted completely through the wall W (see FIGS. 17c and 17d). In FIG. 17d, the spring-loaded tab 128 of the strap member 112 swings the toggle member 110 to its transversal retention position shown in FIGS. 14 to 16, that is generally perpendicular to the strap member 112.

The strap member 112 is then pulled away from the wall W, along arrow 148 in FIG. 17e, such that the linear edges 146 of the toggle member 110 engage the hidden surface of the wall W. The collar 116 is then slid, along arrows 150 (FIG. 17e) towards the wall W and the toggle member 110, along the ratchet teeth 120 of the strap member 112, that is until a skirt 132 of the collar 116 is inserted in the hole H defined in the wall W and a flange 134 of the collar 116 abuts the visible side of the wall W. The grip member 118 is held onto by the user while the collar 116 is displaced towards the wall W. The collar 116 is slid longitudinally along the strap member 112, and without being able to rotate with respect to the strap member 112 as a result of the non-circular opening 136 defined in the collar 116, which defines shoulders 137 (see FIGS. 14 and 15) that are engaged by longitudinal edges 139 of the strap member 112, as best seen in FIG. 15.

Once the wall W is firmly imprisoned between the toggle member 110 and the collar 116, the grip member 118 and the section of the strap member 112 extending between the grip member 118 and the flange 134 of the collar 116, can be discarded, for instance, by cutting or, as in the present embodiment, by bending (see FIG. 17f) as the strap member 112 is provided with weakened areas which allow the strap member 112 to be separated in two. As shown in FIG. 17g, the remaining portion of the strap 112 thus connects the toggle member 110 to the collar 116 within the hole H in the wall W.

Still referring to FIG. 17g, a fastener, such as a screw or a bolt S, can then be engaged through the central opening 136 defined in the collar 116, within a semi-circular channel 138 defined longitudinally along the strap member 112, and through an opening 140 defined in the toggle member 110. This opening 140 in the toggle member 110 may be, for instance, tapped by the fastener such that the fastener becomes firmly secured to the anchor assembly A' which itself is firmly secured to the wall W, as explained hereinabove. If the opening 140 defines a machine tap (as in FIGS. 17a to 17i), the bolt S can be used as the fastener. If the fastener is provided at its head, for instance, with a hook, the anchor assembly A' can be used in a ceiling. Here, the bolt S is used to mount a hook fixture F to the wall W, as seen in FIGS. 17g to 17h.

Furthermore, FIGS. 18 to 29b illustrate another variant anchor assembly A", which is similar to the anchor assemblies A and A' of FIG. 1 (and FIGS. 2 to 13) and FIG. 14 (and FIGS. 15 to 17i), whereby in the following description and drawings that pertain thereto, components of the anchor assembly A" which are identical in function and identical and/or similar in structure to corresponding components of anchor assemblies A and A', but are tagged with the prefix "2" and are thus in the two hundreds with the last two digits thereof being identical to the reference numerals of corresponding components of the anchor assemblies A and A'. New components (or components not identified for either anchor assemblies A and A') provided in the anchor assembly A" start at reference numeral 260.

Figure 18:
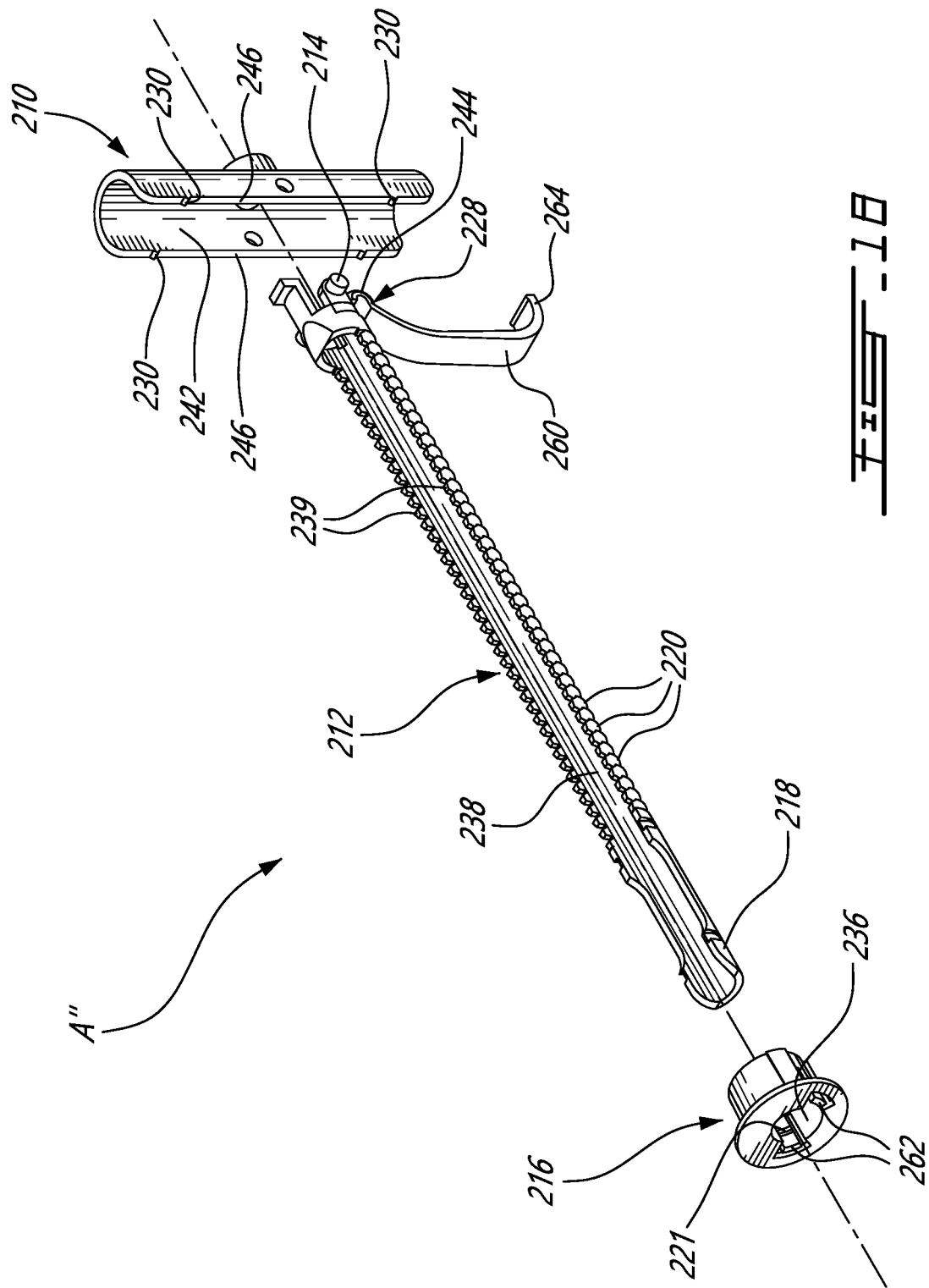
FIG. 18 is an exploded perspective view of an anchor assembly in accordance with a third exemplary embodiment, and showing a toggle member of the anchor assembly in a retention position thereof.
Figure 19:
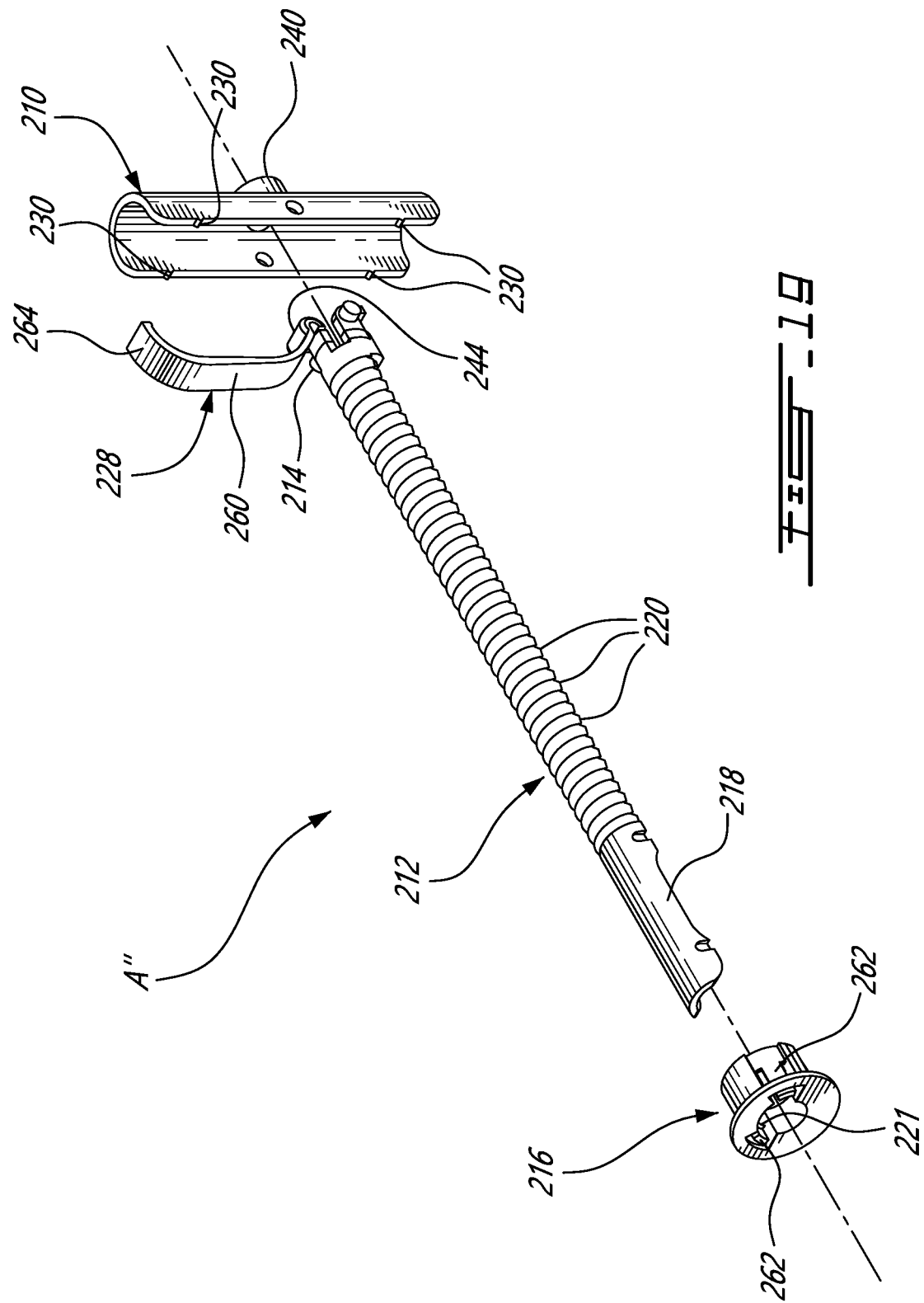
FIG. 19 is a further exploded perspective view of the anchor assembly of FIG. 18, and with the toggle member shown in the retention position thereof.
Figure 20:
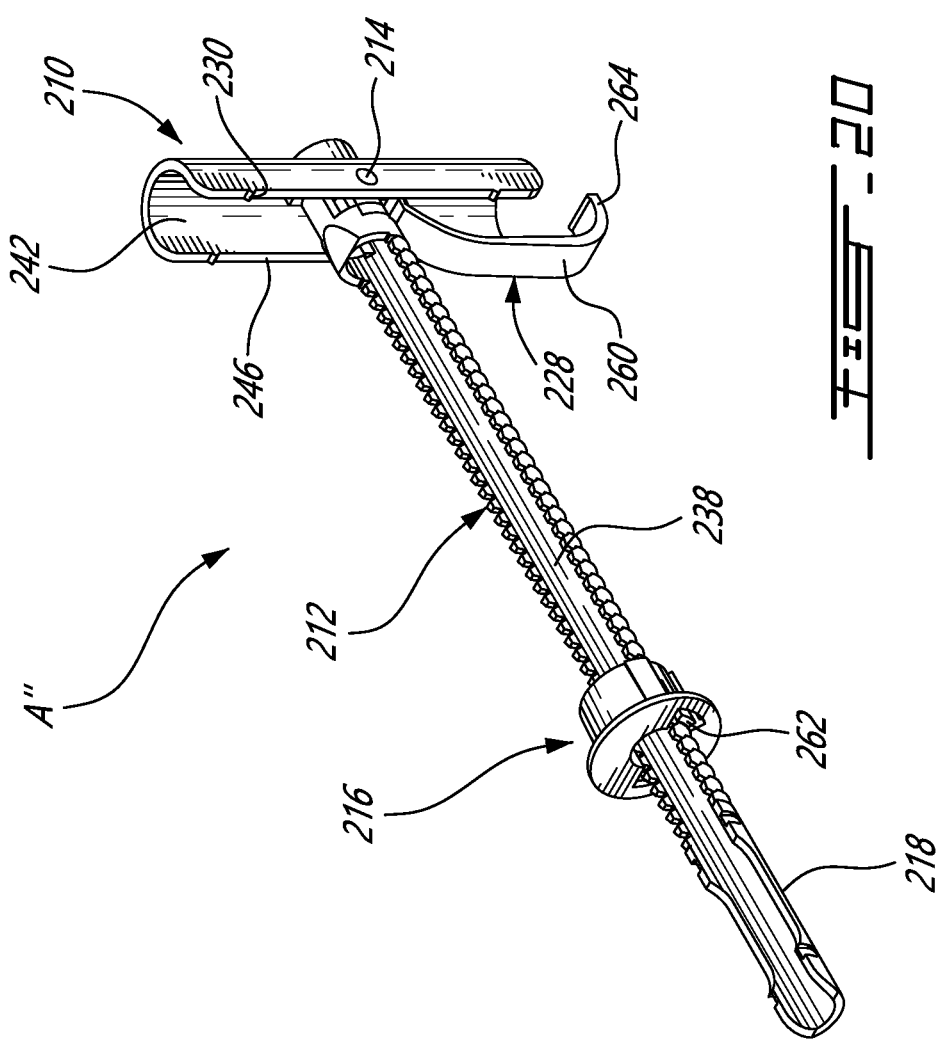
FIGS. 20 to 22 are various perspective views of the anchor assembly of FIG. 18, and with the toggle member shown in the retention position thereof.
Figure 21:
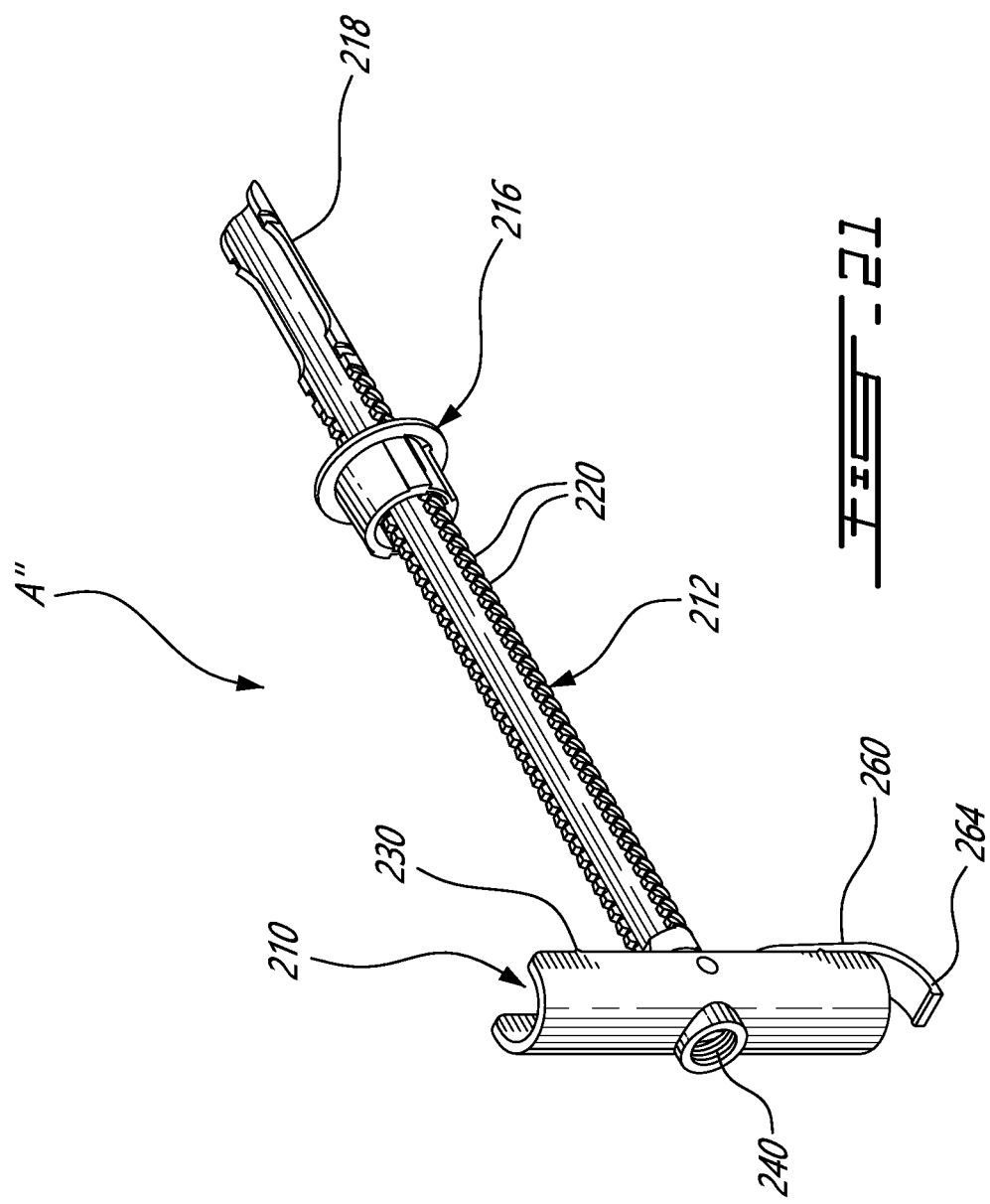
Figure 22:
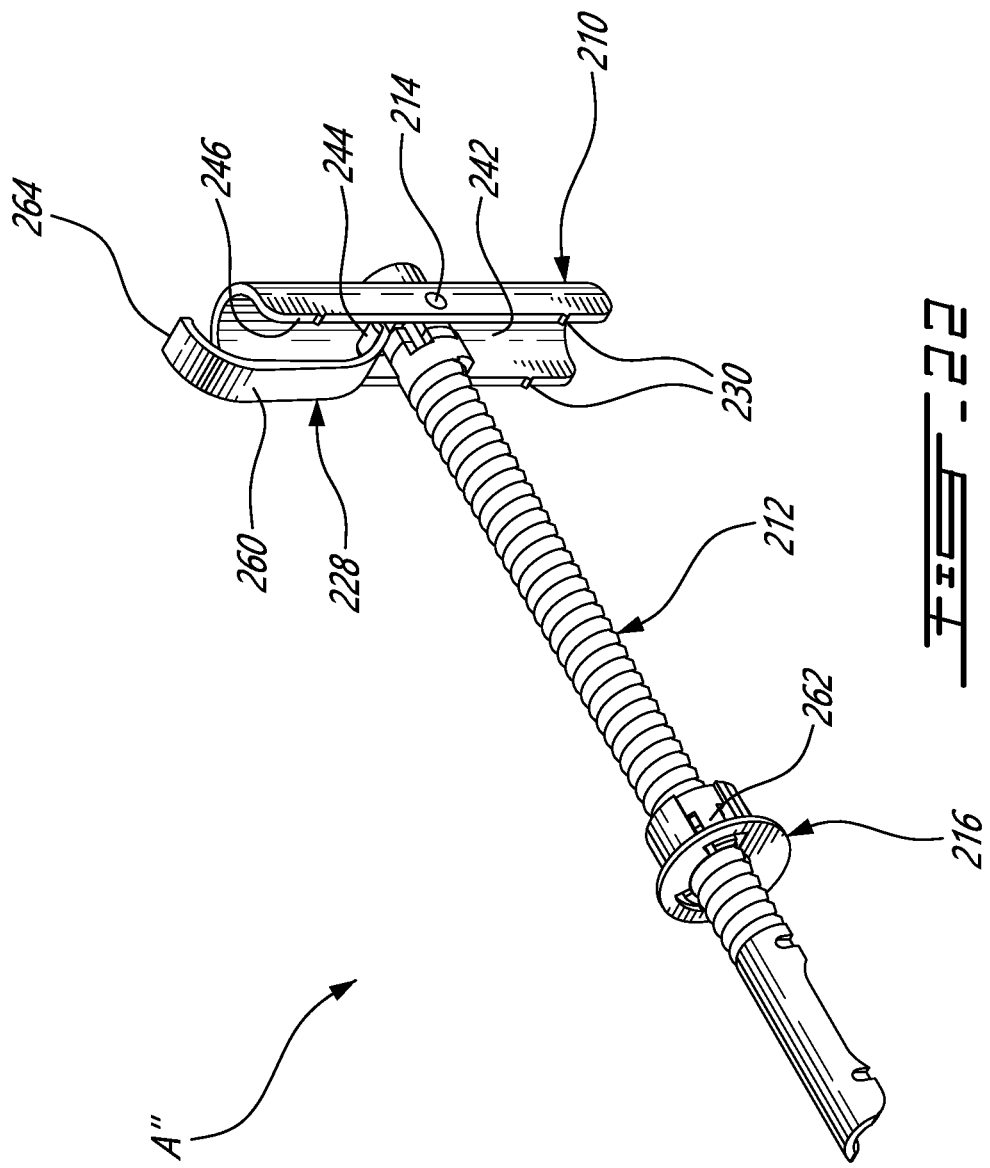
Figure 29A:
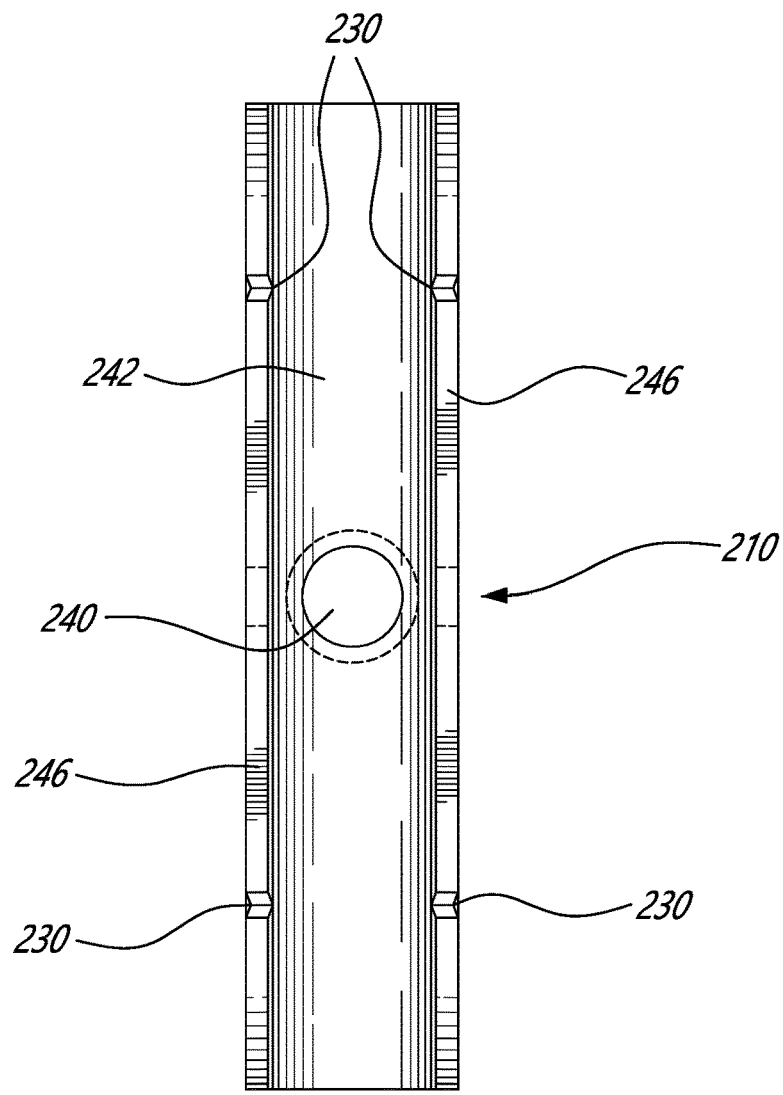
FIGS. 29a and 29b are front and top plan views, respectively, of the toggle member of the anchor assembly of FIG. 18.
Figure 29B:
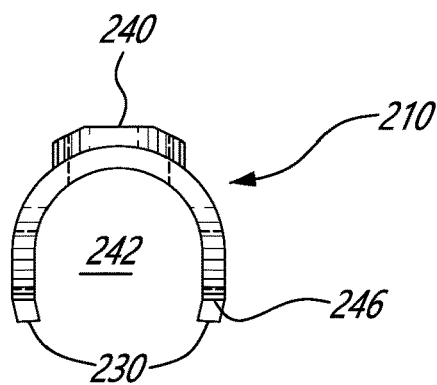

Generally, the anchor assembly A" of FIG. 18 is more similar to the anchor assembly A' of FIG. 14 than to the anchor assembly A of FIG. 1. The main differences between the anchor assembly A" of FIG. 18 and the anchor assembly A' of FIG. 14 are: (1) the anchor assembly A" has a spring-loaded tab 228 that includes an extended curved tail 260; (2) the pointed teeth 230 of the toggle member 210 of the anchor assembly A" are curved inwardly (as best seen in FIGS. 29a and 29b); and (3) the collar 216 of the anchor assembly A" has a pair of spring-loaded arms 262, each provided with a locking element 221 adapted to co-act with the ratchet teeth 220 of the strap member 212 to prevent the collar 216 from moving away from the toggle member 210 once the collar 216 has engaged the ratchet teeth 220 of the strap member 212. We will now provide additional details on the foregoing.

The anchor assembly A" is also adapted to be mounted to a wall for use with a fastener, such as a screw S shown in FIG. 25*i*. The anchor assembly A" mainly comprises a retention member 210 hereinafter referred to as the toggle member 210, the strap member 212 pivotally connected at pivot 214 to the toggle member 210, and a locking member, such as the collar 216. The strap member 212 is thus pivotally connected at its rear, leading, end to the toggle member 210 and is provided at its front end with a grip member 218.

The strap member 212, preferably made of plastic, is of substantially semi-circular cross-section and defines a series of ratchet teeth 220 on an outside surface thereof. The collar 216 is displaceable along the strap member 212, that is only towards the toggle member 210, in that the collar 216 for instance includes the inner locking elements 221 (part of the pair of spring-loaded arms 262), which co-act with the ratchet teeth 220 in order to prevent the collar 216 from being displaced away from the toggle member 210, i.e. from being retracted back towards the grip member 218.

The toggle member 210, as opposed to the toggle member 10 of the anchor assembly A of FIG. 1, herein does not define at a leading end thereof a threaded cutting member, but it could. Therefore, in the case of the anchor assembly A", a hole must be formed, e.g. drilled, through the wall before the anchor assembly A" can be mounted thereto, as will be explained in more detail hereinafter. The toggle member 210 is of C-shaped cross-section such that an open side 242 thereof faces the collar 216, when the toggle member 210 is in the transversal retention position thereof shown in FIGS. 18 to 22.

Figure 25B:
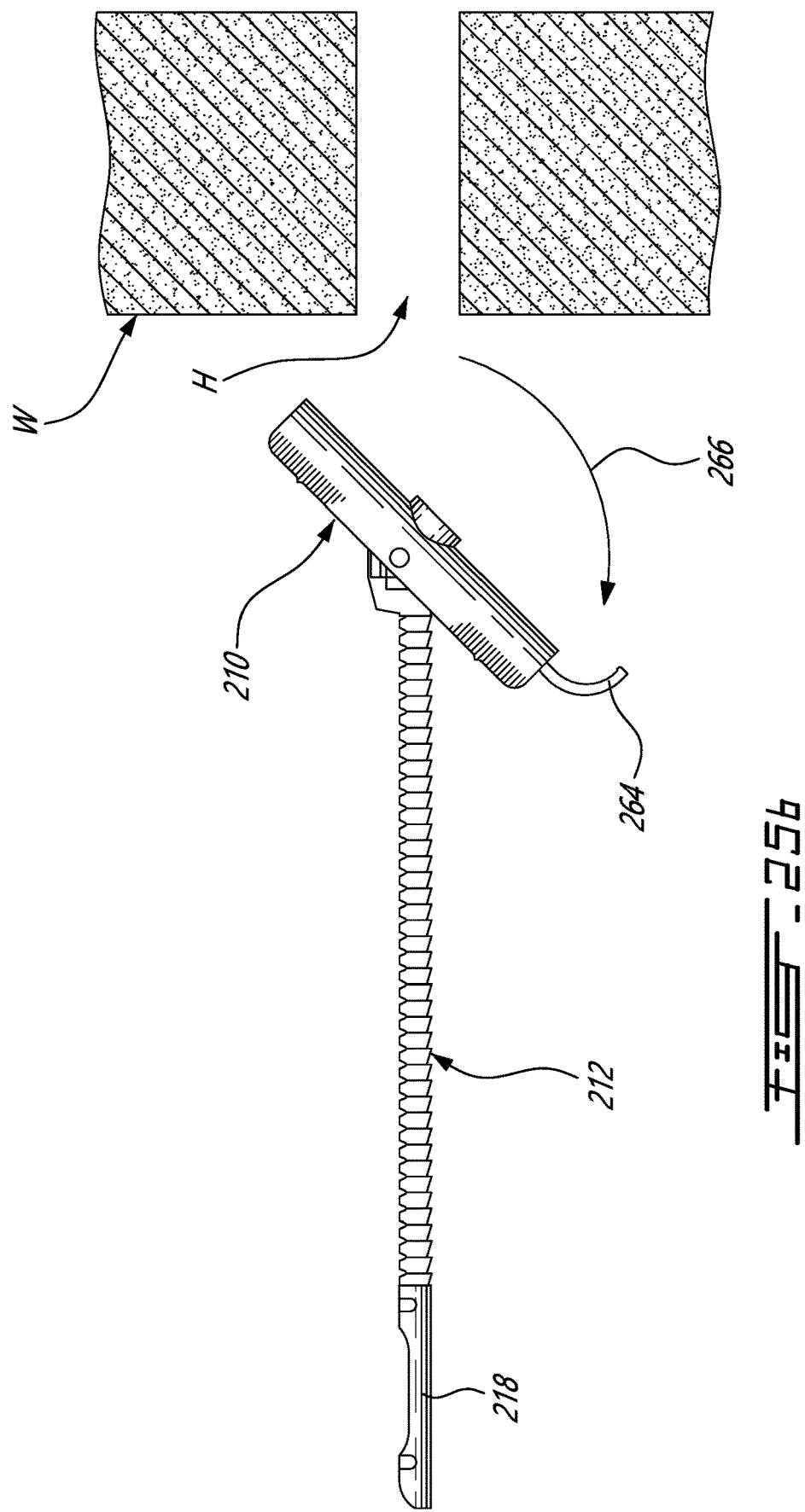
Figure 25C:
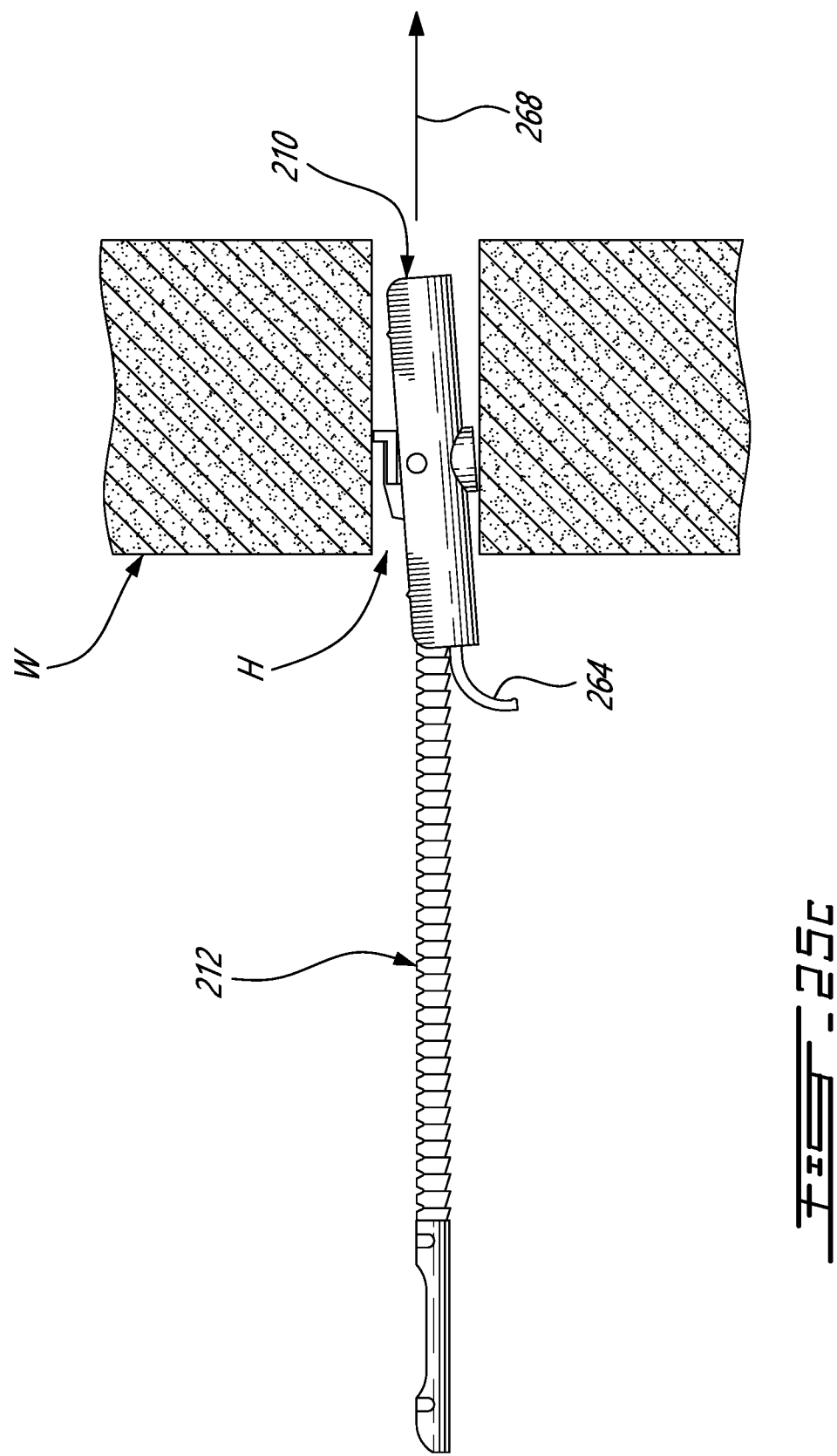
Figure 52:
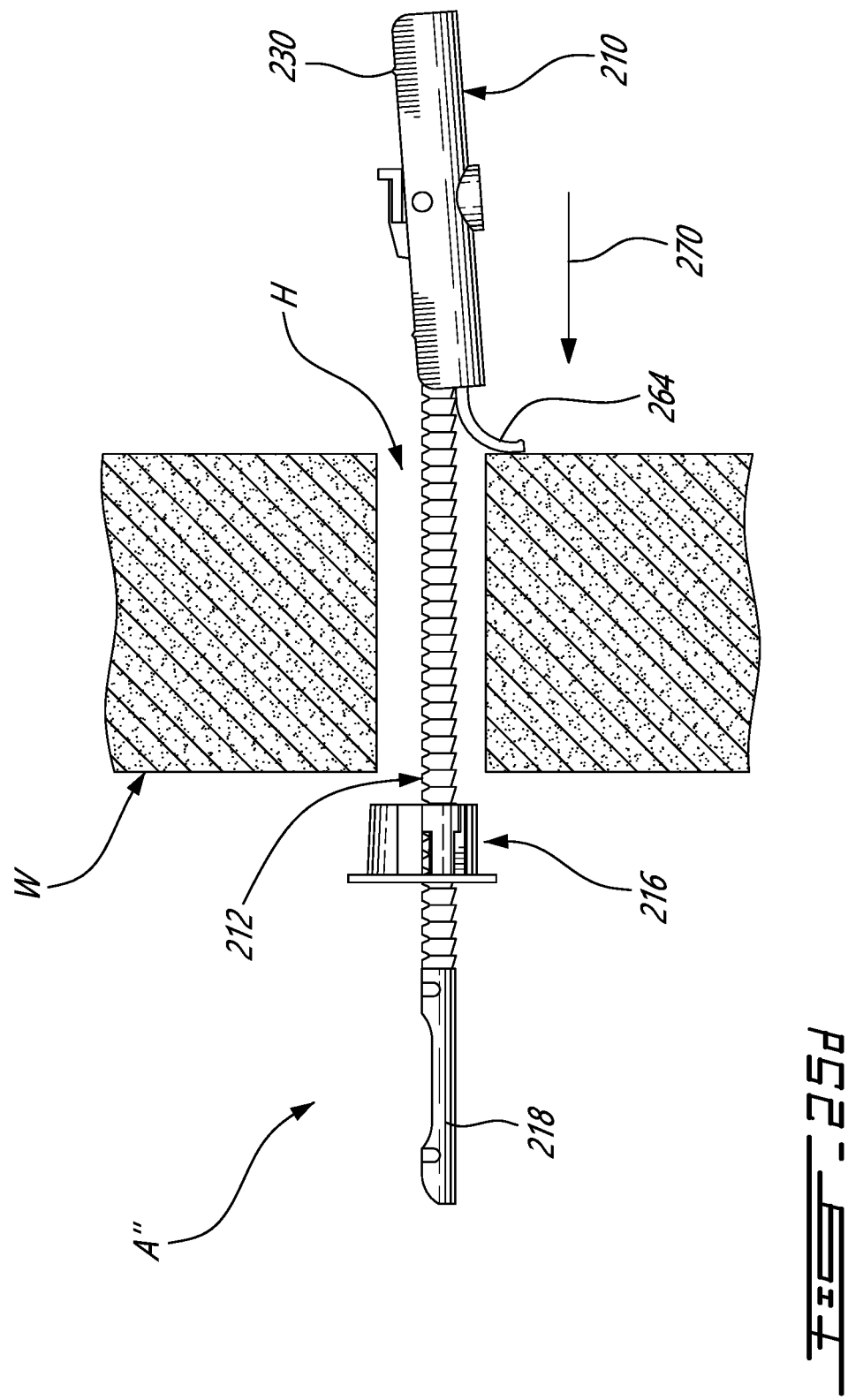

The spring-loaded tab 228 is provided at the rear, i.e. leading, end of the strap member 212 such as to be engaged by the toggle member 210 when the latter is aligned with the strap member 212 (this position is shown in FIGS. 23, 24 and 25*c*). Therefore, with the toggle member 210 and the strap member 212 in such a generally aligned insertion position, the toggle member 210 can be inserted through the wall.

In this insertion position, the spring-loaded tab 228 is in a biased state. Also, in this insertion position, the toggle member 210 is retained to the strap member 212 by way of the inwardly curved pointed teeth 230 of the toggle member 210, which grasp the longitudinal edges 239 of the strap member 212 and so retain the toggle member 210 and the strap member 212 engaged together (in the aligned insertion position), and against the spring force of the spring-loaded tab 228 that is in a collapsed position.

Again in the insertion position, the extended curved tail 260 of the spring-loaded tab 228 extends past one of the longitudinal ends of the toggle member 210 and is, along with its spring-loaded tab 228, biased in a collapsed position. A curved free end 264 of the tail 260 extends outwardly away from the strap member 212, as well seen in FIG. 24.

Generally, once the toggle member 210 has been introduced completely past the hidden surface of the wall, the anchor assembly A" is pulled away from the wall such that the free end 264 engages the hidden side of the wall, causing the curved tail 260 to pull on the toggle member 210, thereby releasing the toggle member 210 from the strap member 212. The toggle member 210 then spring backs so as to assume its transversal retention position shown in FIGS. 18 to 22. This will become more apparent when described hereinbelow with reference to installation FIGS. 25*a* to 25*i*.

As for anchor assembly A', the tab 228 includes a V-shaped tongue 244 that is forcibly folded or collapsed when the toggle member 210 is brought to the insertion position and that causes, as it plastically returns to its at-rest position (of FIGS. 18 to 22) the toggle member 210 to displace to its transversal retention position. Parallel and co-planar edges 246 of the toggle member 210 are adapted to bearably engage the hidden side of the wall when the strap member 212 is pulled on. The pointed teeth 230 of the toggle member 210 are then adapted to penetrate the hidden side of the wall.

Accordingly, with reference to FIGS. 25*a* to 25*i*, when it is desired to install the anchor assembly A" in the wall W, a hole H is first formed through the wall W, using for instance a drill bit B (see FIG. 25*a*). As seen from FIG. 25*b* to FIG. 25*c*, the toggle member 210 is then pivoted along arrow 266 and substantially brought into alignment with the strap member 212 (as seen in FIG. 25*b*), against the bias of the spring-loaded tab 228 (and its V-shaped tongue 244), until the pointed teeth 230 of the toggle member 210 engage the longitudinal edges 239 of the strap member 212 and so connect together the toggle member 210 and the strap member 212 (in the aligned insertion position).

As per FIGS. 25*c* and 25*d*, the toggle member 210 is inserted along arrow 268 completely through the wall W.

Figure 25E:
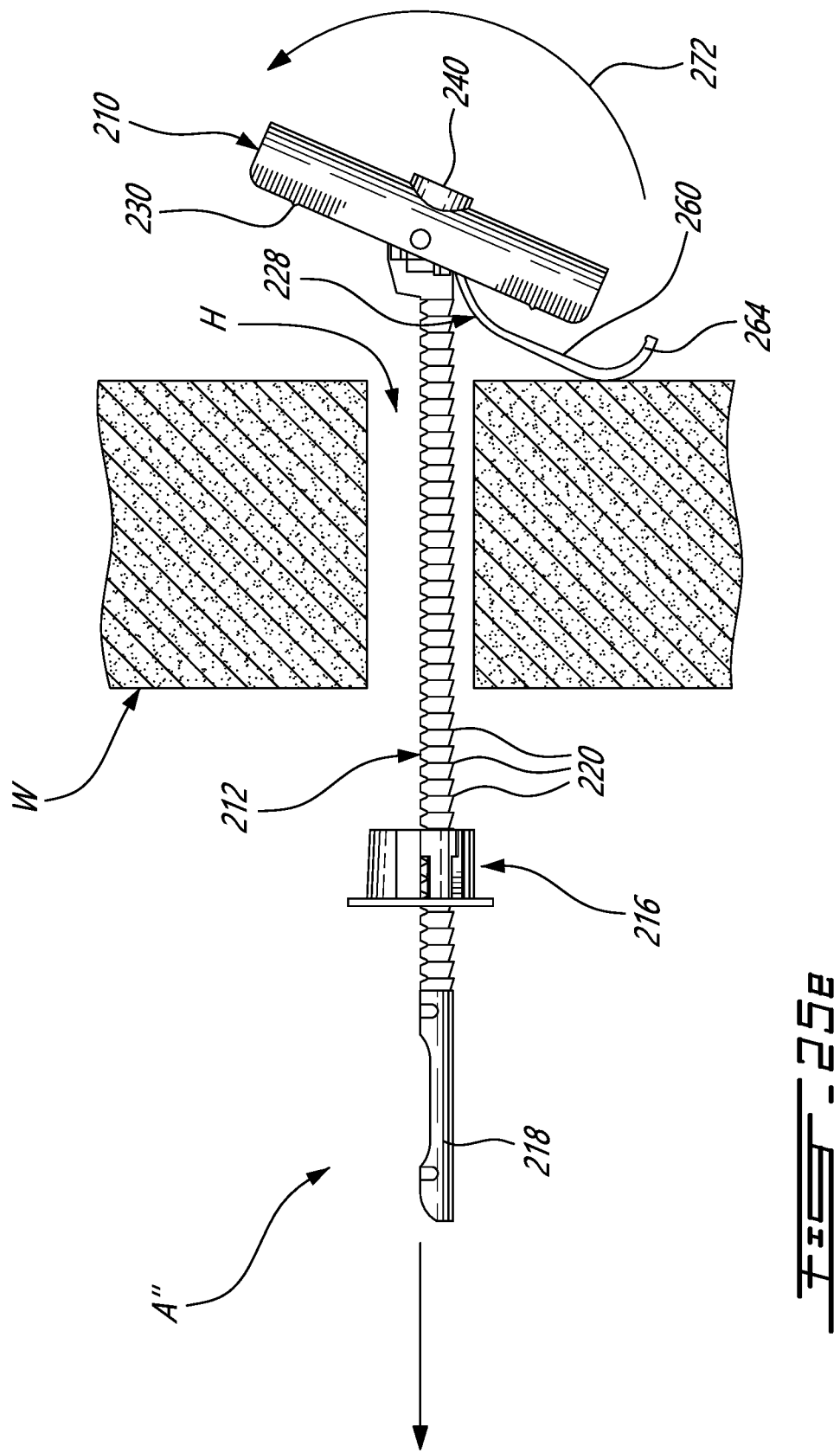
Figure 25F:
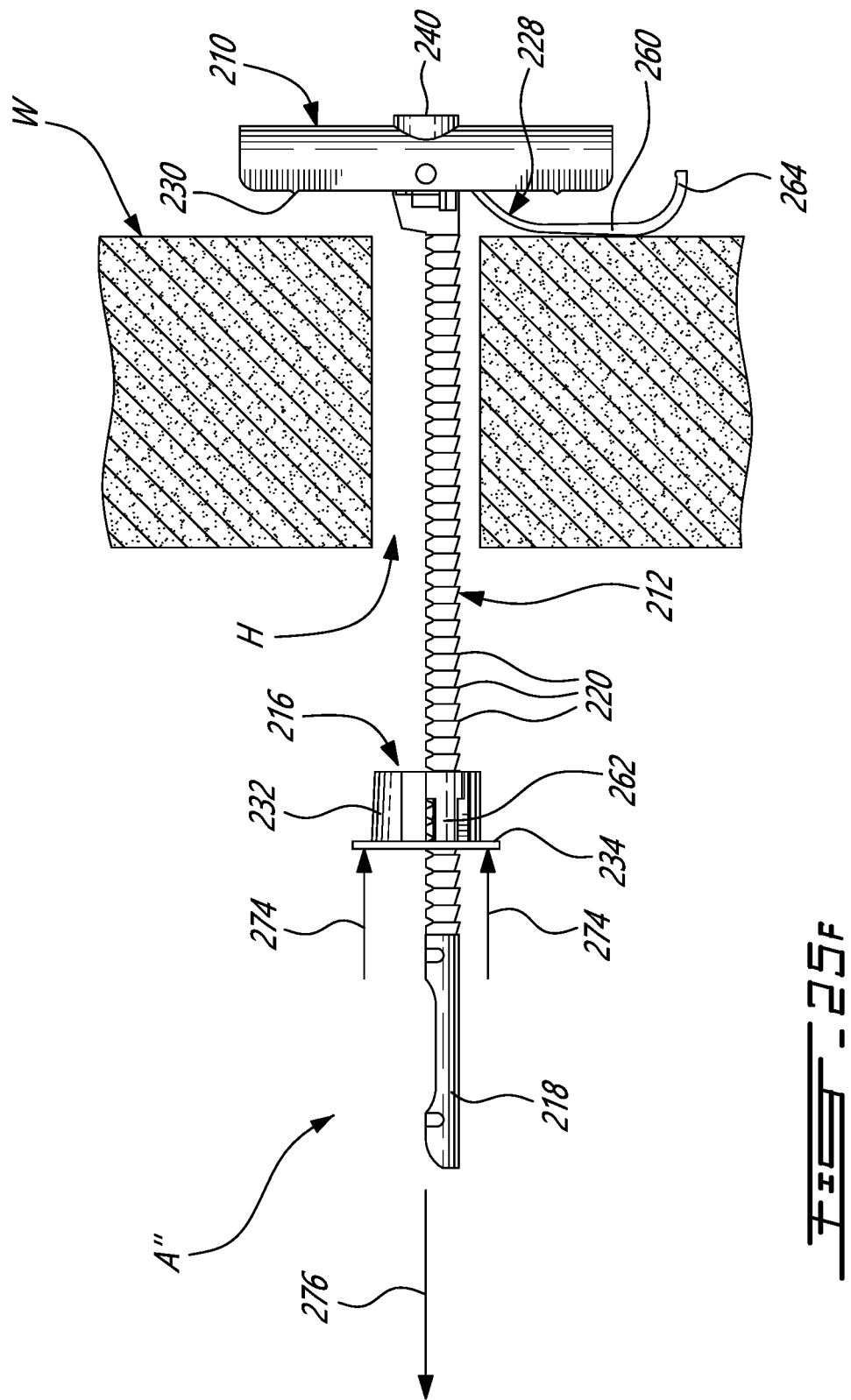
Figures 27A, 27B:
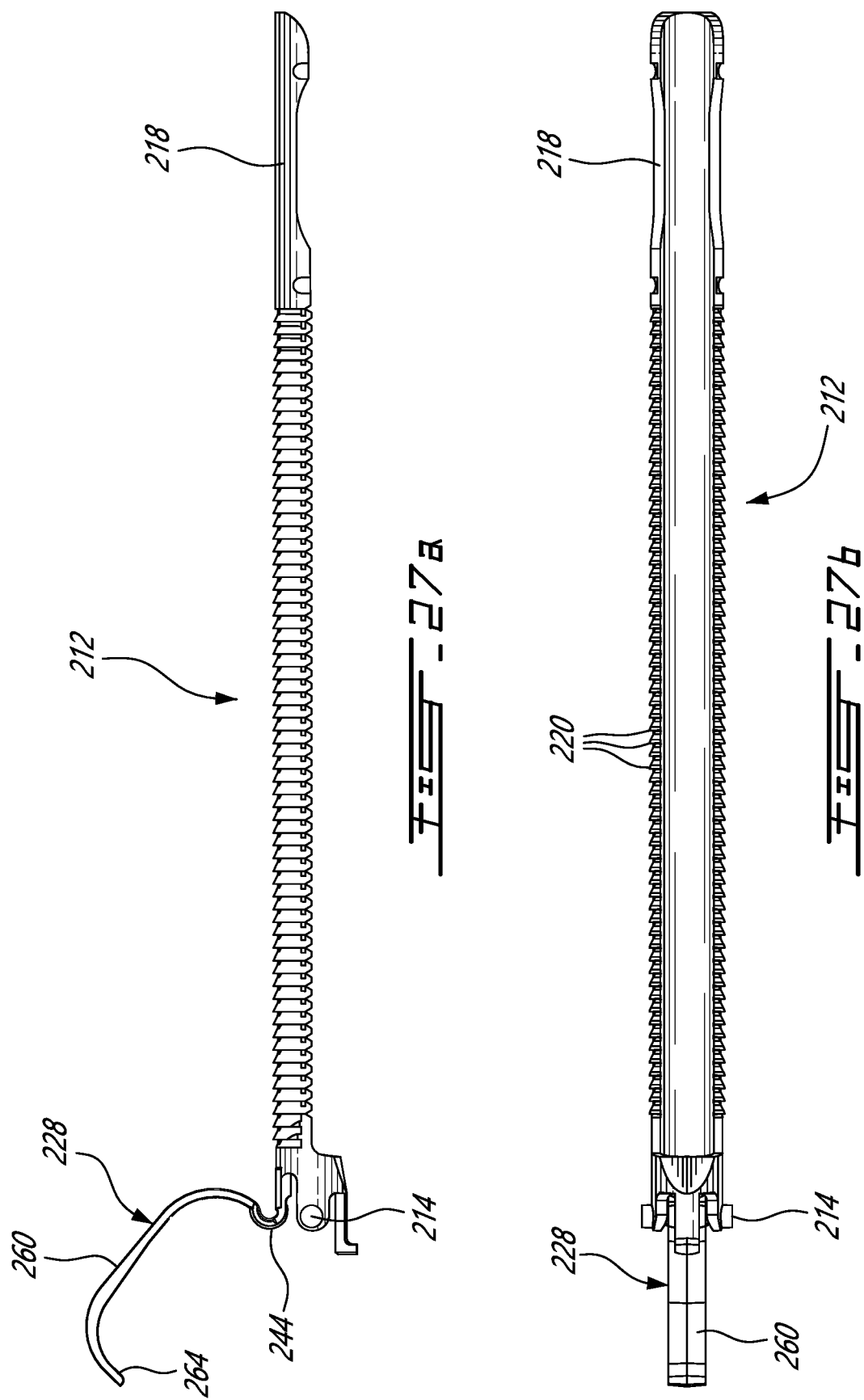
FIGS. 27a and 27b are side and bottom plan views, respectively, of the strap member of the anchor assembly of FIG. 18.
Figure 28B:
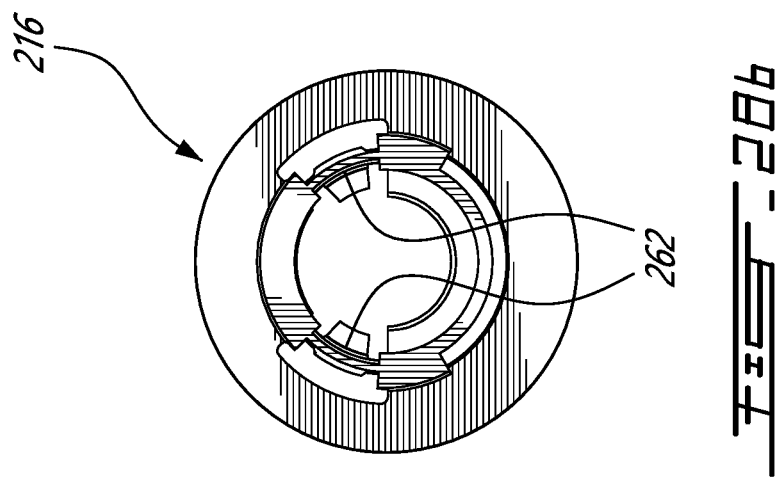
FIGS. 28a and 28b are front and rear views, respectively, of the collar of the anchor assembly of FIG. 18.
Figure 28A:
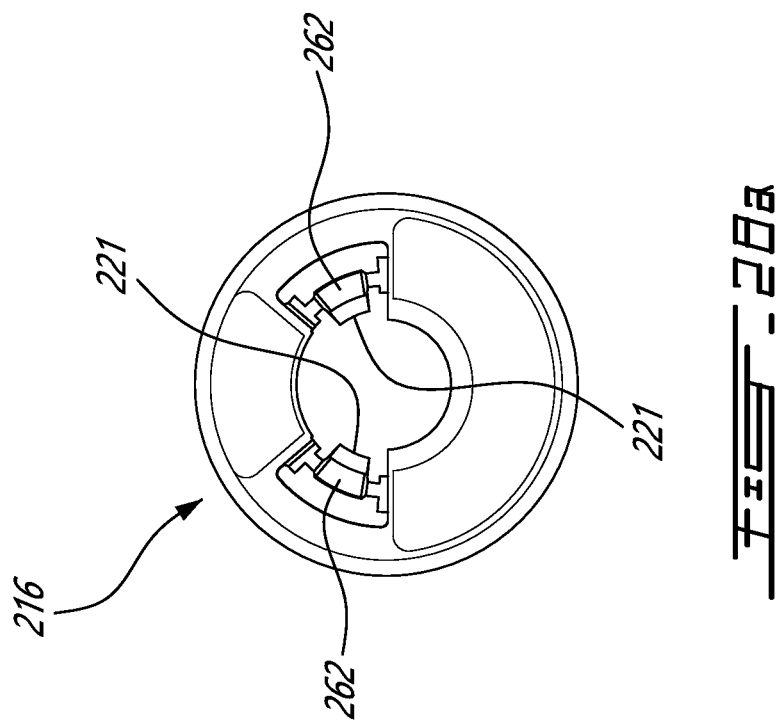

In FIG. 25*d*, once the toggle member 210 has been introduced completely past the hidden surface of the wall W, the anchor assembly A" is pulled away from the wall W, along arrow 270, such that the free end 264 of the curved tail 260 engages the hidden side of the wall W, causing the curved tail 260 to pull on the toggle member 210, thereby releasing the toggle member 210 from the strap member 212, as shown in FIG. 25*e*. Under the spring force of the spring-loaded tab 128 of the strap member 112, the toggle member 210 then spring backs, along arrow 272, to its transversal retention position shown in FIGS. 18 to 22 and also in FIG. 25*f*, which is generally perpendicular to the strap member 212.

The strap member 212 is then pulled away from the wall W such that the linear edges 246 of the toggle member 210 engage the hidden surface of the wall W (or this may result when the collar 216 is moved towards the wall W, as described hereinafter). The collar 216 is then slid, along arrows 274 (FIG. 25*f*) towards the wall W and the toggle member 210, along the ratchet teeth 220 of the strap member 212, that is until a skirt 232 of the collar 216 is inserted in the hole H defined in the wall W and a flange 234 of the collar 216 abuts the visible side of the wall W. The grip member 218 is held onto by the user while the collar 216 is displaced towards the wall W, and may be pulled along arrow 276 if the toggle member 210 is not yet in abutting engagement with the hidden surface of the wall W, which is the case illustrated in FIG. 25*f*. The collar 216 is slid longitudinally along the strap member 212 until it assumes the position shown in FIG. 25*g* and the toggle member 210 is in contact with the hidden surface of the wall W.

Once the wall W is firmly imprisoned between the toggle member 210 and the collar 216, the grip member 218 and the section of the strap member 212 extending between the grip member 218 and the flange 234 of the collar 216, can be discarded, for instance, by cutting or, as in the present embodiment, by bending (see FIG. 25*h*) as the strap member 212 is provided with weakened areas which allow the strap member 212 to be separated in two. As also shown in FIG. 25*h* (and in FIG. 25*i*), the remaining portion of the strap 212 thus connects the toggle member 210 to the collar 216 within the hole H in the wall W.

Now referring to FIG. 25*i*, a fastener, such as a screw or a bolt S, can then be engaged through the central opening 236 defined in the collar 216, within a semi-circular channel 238 defined longitudinally along the strap member 212, and through an opening 240 defined in the toggle member 210. This opening 240 in the toggle member 210 may be, for instance, tapped by the fastener such that the fastener becomes firmly secured to the anchor assembly A" which itself is firmly secured to the wall W, as explained hereinabove. If the opening 240 defines a machine tap or thread as herein (see FIG. 21), the bolt S can be used as the fastener. If the fastener is provided at its head, for instance, with a hook, the anchor assembly A" can be used in a ceiling. Here, the bolt S is used to mount a hook fixture F to the wall W, as seen in FIG. 25*i*.

The steps shown in FIG. 25*c* to FIG. 25*e* can thus conveniently be achieved using a single hand.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting, and it will be understood by persons skilled in the art that other variants and modifications may be made without departing from the scope of the embodiments as defined in the claims appended hereto.

The invention claimed is:

1. An anchor assembly for walls, comprising a strap member, a spring member, a toggle member pivotally mounted to said strap member, and a locking member slidable along said strap member, said toggle member being displaceable between first and second positions thereof, wherein in said first position said toggle member is substantially aligned with said strap member for insertion through a hole in the wall while biasedly engaging said spring member, wherein in the first position the toggle member is engaged to the strap member, wherein said toggle member once behind the wall is adapted to be displaced towards said second position by said spring member, and wherein in said second position said toggle member extends behind the wall at an angle relative to said strap member with said strap member extending from said toggle member through the hole in the wall, said locking member being adapted to be displaced along said strap member and towards the wall and said toggle member, whereby once the anchor assembly is installed, said locking member and said toggle member are connected by a distal section of said strap member and imprison the wall by abutting opposed sides thereof, said toggle member being adapted to be engaged by a fastener introduced through said locking member and through the hole in the wall, wherein, in the first position, the toggle member is engaged to the strap member by way of at least one hook provided on the toggle member and adapted to releasingly engage the strap member.

2. The anchor assembly as defined in claim 1, wherein a proximal section of said strap member located forwardly of said locking member is adapted to be removed once the anchor assembly is installed and the locking member abuts the wall.

3. The anchor assembly as defined in claim 1, wherein locking means are provided for preventing said locking member from being displaced away from said toggle member, once the anchor assembly is installed.

4. The anchor assembly as defined in claim 1, wherein said spring member includes an extended free end, which is adapted to release the toggle member from the strap member and thereby allow the toggle member to displace from the first to the second positions.

5. The anchor assembly as defined in claim 4, wherein the extended free end is curved and is adapted to disengage the toggle member from the strap member when the anchor assembly is pulled such that the free end engages a hidden side of the wall.

6. The anchor assembly as defined in claim 1, wherein the hook includes grasping teeth that extend inwardly from edges of the toggle member.

7. The anchor assembly as defined in claim 6, wherein the toggle member is hollow such as to accommodate therein part of the strap member, in the first position.

8. The anchor assembly as defined in claim 6, wherein the grasping teeth are at least one of pointed and curved.

9. The anchor assembly as defined in claim 1, wherein in the first position, the spring member extends between the toggle member and the strap member.

10. The anchor assembly as defined in claim 9, wherein the extended free end of the spring member extends past the toggle member, in the first position.

11. An anchor assembly for walls, comprising a strap member, a spring member, a toggle member pivotally mounted to said strap member, and a locking member slidable along said strap member, said toggle member being displaceable between first and second positions thereof, wherein in said first position said toggle member is substantially aligned with said strap member for insertion through a hole in the wall while biasedly engaging said spring member, wherein in the first position the toggle member is engaged to the strap member, wherein said toggle member once behind the wall is adapted to be released from the strap member and to displace towards said second position by said spring member, and wherein in said second position said toggle member extends behind the wall at an angle relative to said strap member with said strap member extending from said toggle member through the hole in the wall, said locking member being adapted to be displaced along said strap member and towards the wall and said toggle member, whereby once the anchor assembly is installed, said locking member and said toggle member are connected by a distal section of said strap member and imprison the wall by abutting opposed sides thereof, said toggle member being adapted to be engaged by a fastener introduced through said locking member and through the hole in the wall, wherein, in the first position, the toggle member is engaged to the strap member by way of at least one hook provided on the toggle member and adapted to releasingly engage the strap member.

12. The anchor assembly as defined in claim 11, wherein said spring member includes an extended free end, which is adapted to release the toggle member from the strap member and thereby allow the toggle member to displace from the first to the second positions.

13. The anchor assembly as defined in claim 12, wherein the extended free end is curved and is adapted to disengage the toggle member from the strap member when the anchor assembly is pulled such that the free end engages a hidden side of the wall.

14. The anchor assembly as defined in claim 11, wherein the hook includes grasping teeth that extend inwardly from edges of the toggle member.

15. The anchor assembly as defined in claim 14, wherein the toggle member is hollow such as to accommodate therein part of the strap member, in the first position.

16. The anchor assembly as defined in claim 14, wherein the grasping teeth are at least one of pointed and curved.

17. The anchor assembly as defined in claim 11, wherein in the first position, the spring member extends between the toggle member and the strap member.

18. The anchor assembly as defined in claim 17, wherein the extended free end of the spring member extends past the toggle member, in the first position.

\* \* \* \* \*